(12) United States Patent
Raisher et al.

(10) Patent No.: US 12,177,306 B2
(45) Date of Patent: *Dec. 24, 2024

(54) PRIORITIZED PROVISION AND RETRIEVAL OF OFFLINE MAP DATA

(71) Applicant: Google LLC, Mountain View, CA (US)

(72) Inventors: Jordan Michael Raisher, Seattle, WA (US); Brett Andrew McLarnon, Bellevue, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/317,555

(22) Filed: May 15, 2023

(65) Prior Publication Data

US 2023/0291805 A1     Sep. 14, 2023

Related U.S. Application Data

(63) Continuation of application No. 16/761,321, filed as application No. PCT/US2019/061444 on Nov. 14, 2019, now Pat. No. 11,689,632.

(51) Int. Cl.
*H04L 67/52*      (2022.01)
*G01C 21/36*      (2006.01)
*H04L 67/5681*    (2022.01)

(52) U.S. Cl.
CPC ............. *H04L 67/52* (2022.05); *G01C 21/36* (2013.01); *H04L 67/5681* (2022.05)

(58) Field of Classification Search
None
See application file for complete search history.

(56) References Cited

U.S. PATENT DOCUMENTS 8,781,735 B2 * 7/2014 Udeshi ................ G01C 21/367
                                                    701/457
8,855,684 B2  10/2014 Bellver et al.
(Continued)

FOREIGN PATENT DOCUMENTS

CN    106323300    1/2017
CN    109584705    9/2021
(Continued)

OTHER PUBLICATIONS

International Search Report and Written Opinion for Application No. PCT/US2019/061444, mailed Aug. 12, 2020, 14 pages.
(Continued)

*Primary Examiner* — Ranodhi Serrao
(74) *Attorney, Agent, or Firm* — DORITY & MANNING P.A.

(57) ABSTRACT

Provided are methods, systems, devices, and tangible non-transitory computer readable media for offline mapping and navigation. The disclosed technology can determine a current region associated with a current location of a navigation device. Predicted travel destinations from the current region can be determined based on aggregated travel data. The aggregated travel data can include previous travel destinations from within the current region. Based on the current region and the predicted travel destinations, additional regions associated with the current region can be determined. Further, connectivity information can be determined based on network data. The connectivity information can be associated with network connectivity within the additional regions. The additional regions can be prioritized based on the connectivity information. Furthermore, portions of offline map data associated with the respective additional regions can be sent to the navigation device in an order partly based on the priority of the additional regions.

20 Claims, 10 Drawing Sheets

(56) References Cited

U.S. PATENT DOCUMENTS

| | | | |
|---|---|---|---|
| 9,026,354 B1 | 5/2015 | Persson et al. | |
| 9,097,552 B2* | 8/2015 | Udeshi | G01C 21/30 |
| 9,222,787 B2 | 12/2015 | Blumenberg et al. | |
| 9,267,803 B2* | 2/2016 | Kalai | H04L 67/025 |
| 9,322,656 B2 | 4/2016 | Barnes et al. | |
| 10,077,987 B2* | 9/2018 | Maurer | G01C 21/005 |
| 10,203,698 B1 | 2/2019 | Jafari Tafti et al. | |
| 10,565,795 B2* | 2/2020 | Charlton | H04L 51/046 |
| 2007/0015518 A1 | 1/2007 | Winter et al. | |
| 2008/0132249 A1 | 6/2008 | Hamilton | |
| 2010/0002012 A1 | 1/2010 | Andreasson | |
| 2011/0287789 A1 | 11/2011 | Yang et al. | |
| 2012/0143504 A1* | 6/2012 | Kalai | H04L 67/025 |
| | | | 701/533 |
| 2013/0325326 A1 | 12/2013 | Blumenberg et al. | |
| 2013/0345969 A1* | 12/2013 | Udeshi | H04W 4/023 |
| | | | 701/461 |
| 2014/0343841 A1* | 11/2014 | Faaborg | G01C 21/3438 |
| | | | 701/465 |
| 2015/0066366 A1 | 3/2015 | Pang et al. | |
| 2015/0281710 A1 | 10/2015 | Sievert et al. | |
| 2018/0210912 A1 | 7/2018 | Radus et al. | |
| 2018/0352370 A1* | 12/2018 | Ball | H04W 4/021 |
| 2018/0352374 A1* | 12/2018 | Ball | G06F 16/9537 |
| 2018/0374032 A1* | 12/2018 | Pan | G01C 21/3438 |
| 2019/0025065 A1* | 1/2019 | Maurer | G01C 21/3415 |
| 2019/0163689 A1 | 5/2019 | Stahlin | |
| 2019/0277651 A1* | 9/2019 | Ruikar | G01C 21/3889 |
| 2019/0287121 A1 | 9/2019 | Waksman et al. | |

FOREIGN PATENT DOCUMENTS

| | | |
|---|---|---|
| DE | 102017009510 | 3/2018 |
| EP | 3555567 | 10/2019 |

OTHER PUBLICATIONS

Machine Translated Chinese Search Report Corresponding to Application No. 2019800246981 on Mar. 25, 2024.

* cited by examiner

PRIORITIZED PROVISION AND RETRIEVAL OF OFFLINE MAP DATA

PRIORITY CLAIM

This application is a continuation of U.S. application Ser. No. 16/761,321 filed on May 4, 2020, which is based upon and claims the right of priority under 35 U.S.C. § 371 to International Application No. PCT/US2019/061444 filed on Nov. 14, 2019. Applicant claims priority to and the benefit of each of such applications and incorporates all such applications herein by reference in their entirety for all purposes.

FIELD

The present disclosure relates generally to a system for providing and retrieving offline data associated with geographic regions.

BACKGROUND

Operations associated with mapping information can be implemented on a variety of computing devices. These operations can include processing the mapping information for access and use by a user or computing system. Further, the operations can include sending and receiving data to remote computing systems. However, the types of operations and the ways in which the operations are performed can change over time, as can the underlying hardware that implements the operations. Accordingly, there are different ways to leverage computing resources associated with mapping information.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of providing offline map data. The computer-implemented method can include determining, by a computing system including one or more processors, a current region associated with a current location of a navigation device. The computer-implemented method can include determining, by the computing system, based at least in part on aggregated travel data, predicted travel destinations from the current region. The aggregated travel data can include previous travel destinations from within the current region. The computer-implemented method can include determining, by the computing system, based at least in part on the current region and the predicted travel destinations, one or more additional regions associated with the current region. The computer-implemented method can include determining, by the computing system, connectivity information based at least in part on network data. The connectivity information can be associated with network connectivity available to the navigation device within each of the one or more additional regions. The computer-implemented method can include prioritizing, by the computing system, the one or more additional regions based at least in part on the connectivity information. Furthermore, the computer-implemented method can include sending, by the computing system, one or more portions of offline map data associated with the respective one or more additional regions to the navigation device in an order based at least in part on the priority of the one or more additional regions.

Another example aspect of the present disclosure is directed to one or more tangible non-transitory computer-readable media storing computer-readable instructions that when executed by one or more processors cause the one or more processors to perform operations. The operations can include determining a current region associated with a current location of a navigation device. The operations can include determining, based at least in part on aggregated travel data, predicted travel destinations from the current region. The aggregated travel data can include previous travel destinations from within the current region. The operations can include determining, based at least in part on the current region and the predicted travel destinations, one or more additional regions associated with the current region. The operations can include determining connectivity information based at least in part on network data. The connectivity information can be associated with network connectivity available to the navigation device within each of the one or more additional regions. The operations can include prioritizing the one or more additional regions based at least in part on the connectivity information. Furthermore, the operations can include sending one or more portions of offline map data associated with the respective one or more additional regions to the navigation device in an order based at least in part on the priority of the one or more additional regions.

Another example aspect of the present disclosure is directed to a computing system that can include: one or more processors; and one or more tangible non-transitory computer-readable media storing instructions that when executed by the one or more processors cause the one or more processors to perform operations. The operations can include determining a current region associated with a current location of a navigation device. The operations can include determining, based at least in part on aggregated travel data, predicted travel destinations from the current region. The aggregated travel data can include previous travel destinations from within the current region. The operations can include determining, based at least in part on the current region and the predicted travel destinations, one or more additional regions associated with the current region. The operations can include determining connectivity information based at least in part on network data. The connectivity information can be associated with network connectivity available to the navigation device within each of the one or more additional regions. The operations can include prioritizing the one or more additional regions based at least in part on the connectivity information. Furthermore, the operations can include sending one or more portions of offline map data associated with the respective one or more additional regions to the navigation device in an order based at least in part on the priority of the one or more additional regions.

Other example aspects of the present disclosure are directed to other methods, systems, devices, apparatuses, or tangible non-transitory computer-readable media for the provision and retrieval of offline map data.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
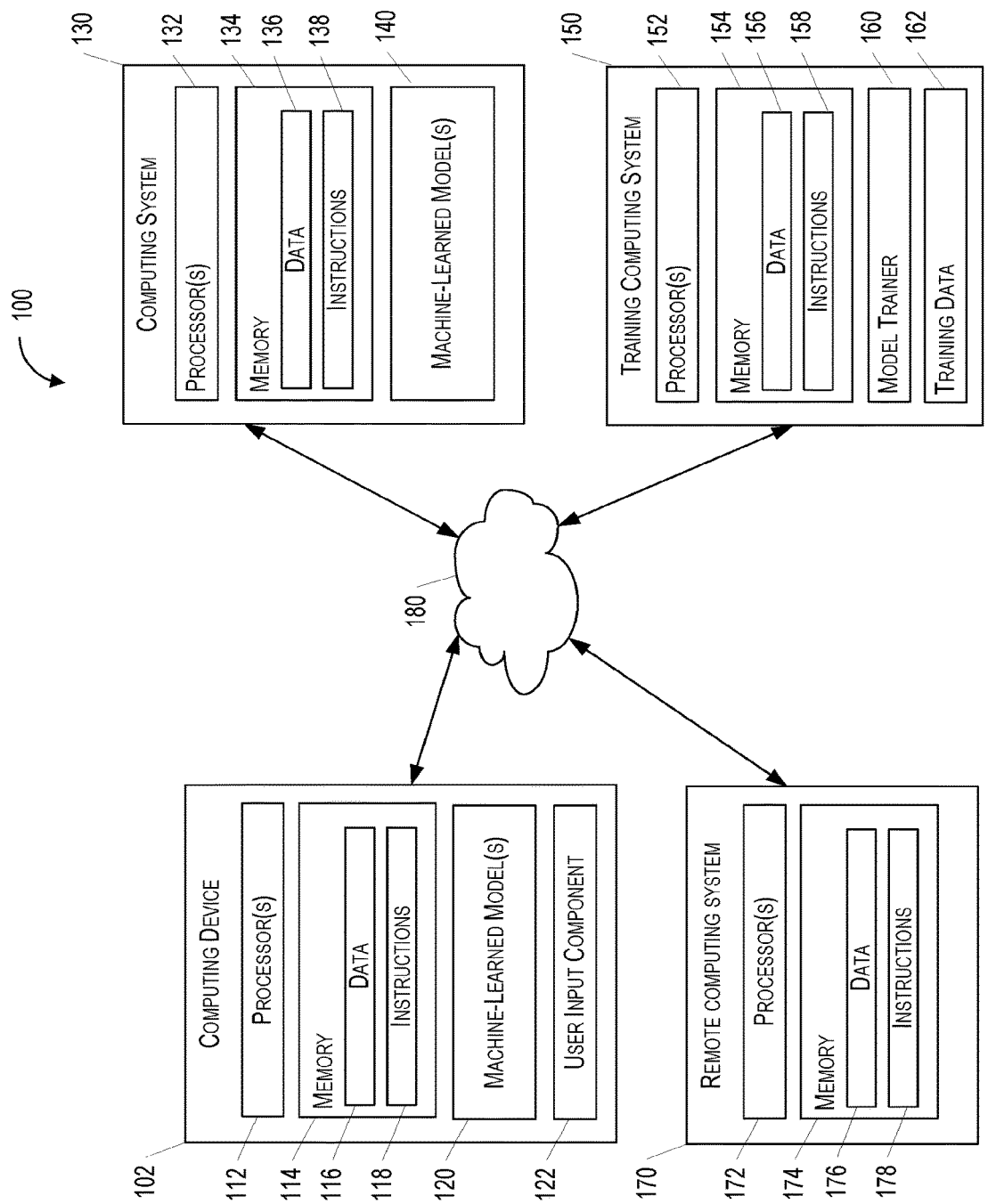
FIG. 1 depicts a diagram of an example system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to an offline navigation system that can be used to send offline map data to a navigation device. As used herein, the term "offline map data" can be understood to refer to data (e.g., map data) for a region of limited network connectivity, which may not be available or accessible to a device (e.g., a navigation device) of a user once the device of the user enters that particular region. The offline map data can be retrieved from a computing device (e.g., a server computing device) by the navigation device whilst the device is in a region of higher network connectivity. For example, the disclosed technology can be used to send offline map data to a navigation device in a way that ensures that the navigation device has sufficient offline map data to navigate its immediate environment as well as nearby regions in which access to online map data may be limited or non-existent.

In particular, the disclosed technology can use the current location of a navigation device (e.g., a smartphone or in-vehicle navigation system) and information associated with network connectivity in additional regions (e.g., neighboring regions around a region associated with the current location of the navigation device) to determine what offline map data should be sent to the navigation device as well as where and/or when the offline map data should be sent to the navigation device. Before sending the offline map data, the additional regions associated with the map data can be prioritized based on their respective network connectivity. Further, check-in boundaries (e.g., locations at which the offline map data is sent to the navigation device) can also be determined. Portions of the offline map data for the associated additional regions can then be sent to the navigation device in a prioritized order, which is more efficient due to the reduction in excessive use of sometimes scarce network resources. As a result, the disclosed technology can improve the overall effectiveness with which offline map data for navigation devices is determined and provided.

Figure 2:
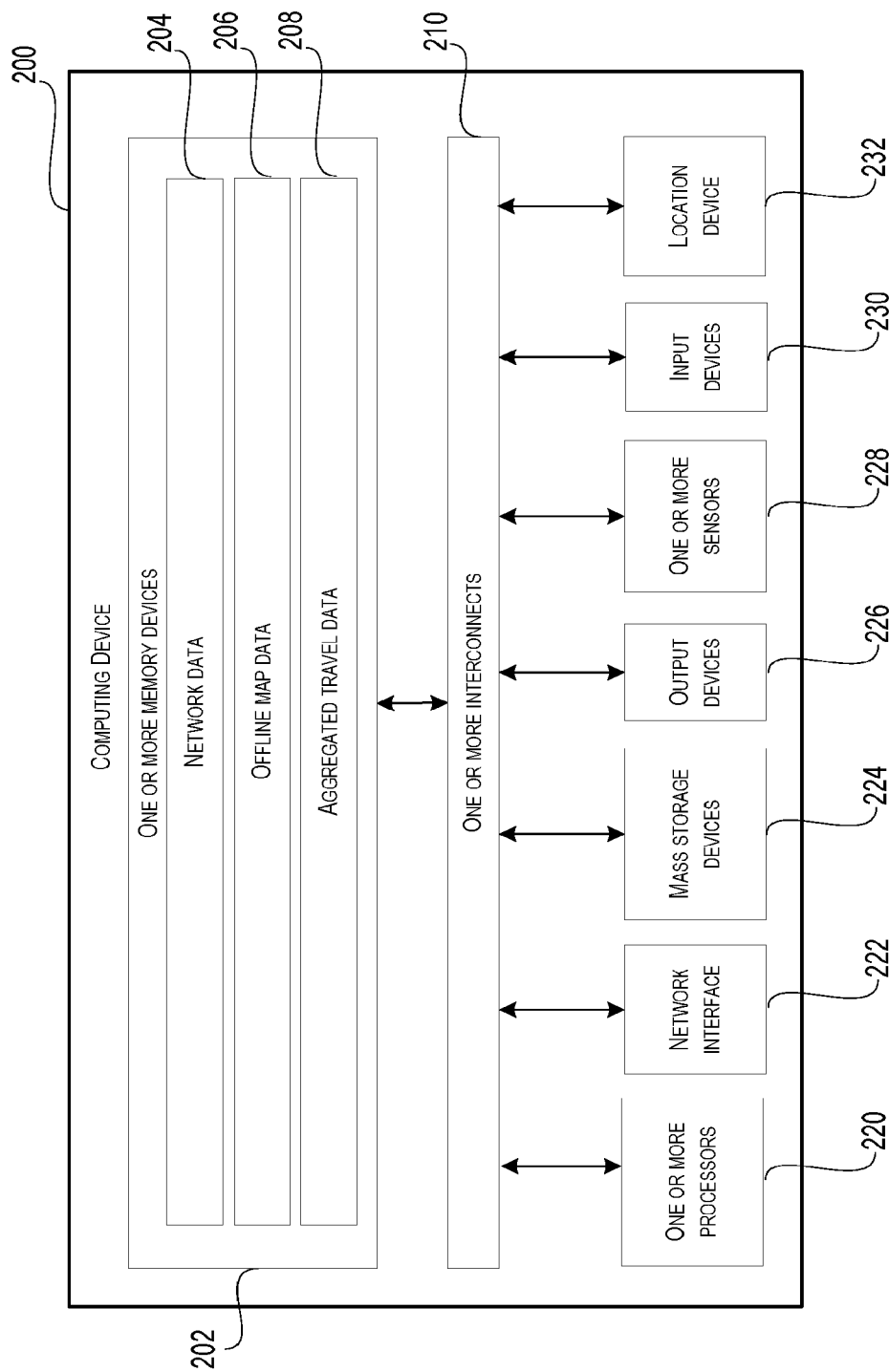
FIG. 2 depicts a diagram of an example device according to example embodiments of the present disclosure.

By way of further example, the offline navigation computing system (e.g., the computing system 130 that is depicted in FIG. 1) can determine the current location of the navigation device (e.g., the computing device 102 that is depicted in FIG. 1 or the computing device 200 that is depicted in FIG. 2) and a region associated with the current location (e.g., the geographic regions within a predetermined radius of the navigation device). Aggregated travel data (e.g., aggregated travel data including previous destinations that, a device associated with a user (or devices associated with other users) have travelled to from the current region) can then be used to predict destinations to which the navigation device might travel. Further, using the predicted destinations, additional regions associated with (e.g., adjacent to) the current region can be determined as well as connectivity (e.g., network throughput) within those regions. The regions can be prioritized based on their connectivity (e.g., low connectivity regions being prioritized more highly than high connectivity regions) and portions of offline map data associated with the additional regions can be sent to the navigation device based on the priority of the respective regions. For example, when the navigation device is in a region surrounded by three high connectivity regions and one low connectivity region, portions of offline map data for the low connectivity region will be sent before portions of offline map data for the high connectivity regions.

Accordingly, the disclosed technology can increase navigational safety by providing a user with sufficient offline map data to navigate through low connectivity regions. Further, the more effective provision of offline map data can result in more efficient use of both network resources and battery resources by the navigation device.

The offline navigation computing system can determine a region (e.g., a current region) associated with a location (e.g., a current location) of a navigation device. The current region can include a geographic region. For example, the current location of the navigation device (e.g., latitude, longitude, and/or altitude) can be determined using various techniques including any combination of satellite based geolocation (e.g., GPS), and/or the relative strength of signals from communications towers (e.g., cellular telephone towers). Further, the geographic region can be defined in a variety of ways including a predetermined radius (e.g., radius in meters) around the navigation device, a predetermined area (e.g., an area in square meters) around the navigation device, and/or a set of geographic coordinates (e.g., latitude, longitude, and/or altitude) establishing the boundaries of the current region.

The navigation device can include any device or system that can be used for navigation (e.g., a smart phone and/or an automotive navigation system) and/or mapping. Further, the navigation device can be configured to perform one or more operations including operations associated with determining the location of the navigation device, receiving information or data from a remote source, and/or displaying information or data associated with the location of the navigation device and the geographic environment surrounding the navigation device.

The offline navigation computing system can determine predicted travel destinations from the current region. Further, the predicted travel destinations can include one or locations to which the navigation device is predicted to travel from its current location. The predicted travel destinations can be based at least in part on aggregated travel data which can include previous travel destinations from within the current region. For example, the aggregated travel data can include locations (e.g., latitude, longitude, and/or altitude) of devices (e.g., devices associated with unique identifiers) at previous time intervals. Based on the locations associated with the devices at the previous time intervals, the previous travel destinations for the devices can be determined, including travel destinations that are associated with a travel route that includes locations in the current region (e.g., travel routes that begin in or pass through the current region).

Furthermore, in some embodiments, the predicted travel destinations can be based at least in part on statistical analysis of the locations that were previously travelled to from one or more locations within the current region. For example, a current region with an area of one square kilometer (1 km$^2$) can include four-hundred equally sized sub-regions measuring twenty square meter (20 m$^2$) each. The aggregated travel data can include a set of locations previously travelled to from each sub-region, which can be used to determine a distribution of previous travel destinations, including previous travel destinations in the one or more additional regions. The aggregated travel data can then be used to determine the predicted travel destinations, including the previous travel destinations that were most frequently visited.

In some embodiments, the predicted travel destinations can be based at least in part on use of one or more machine-learned models (e.g., the one or more machine-learned models 120 and/or the one or more machine-learned models 140 that are depicted in FIG. 1) that have been configured and/or trained to determine the predicted travel destinations based at least in part on input including the aggregated travel data. For example, the one or more machine-learned models can be trained using training data including locations (e.g., latitude, longitude, and/or altitude) of various devices over time. The training data can be used as input to the one or more machine-learned models, which can generate output including predicted destinations that can be evaluated (e.g., evaluated using a loss function) against ground-truth destinations of the various devices. Iterative training of the one or more machine-learned models can be performed to reduce the associated loss and result in more accurate prediction of the travel destination of a device (e.g., the navigation device) based at least in part on the current location of the device.

In some embodiments, the aggregated travel data can be anonymized to exclude identifying information associated with travel to the previous travel destinations. For example, the unique device identifiers and/or personal names associated with devices from which the aggregated travel data is based can be replaced with a corresponding set of unique identifiers that are not associated with the device and/or personal names.

The offline navigation computing system can determine one or more additional regions associated with the current region. The determination of the one or more additional regions can be based at least in part on the current region and/or the predicted travel destinations. For example, the location of the one or more additional regions can be relative to the location of the current region (e.g., four regions located in the four cardinal directions relative to the current region). Further, a size of each of the one or more additional regions can be correlated with a distance from the current location of the navigation device to each of the one or more additional regions respectively. For example, the size of the one or more additional regions further away from the current location of the navigation device can be greater than the one or more additional regions closer to the current location of the navigation device.

In some embodiments, each of the current region and/or the one or more additional regions can be respectively associated with one or more ways of dividing spaces (e.g., geographical regions) including the use of one or more S2 cells and/or one or more Mercator tiles.

The one or more additional regions associated with the current region can include one or more additional regions adjacent to the current region, one or more additional regions within a predetermined distance from the current region, one or more additional regions outside of a predetermined distance from the current region, and/or one or more additional regions that overlap the current region. Further, in some embodiments, any of the current region and/or the one or more additional regions can be non-overlapping with respect to other additional regions; overlap one or more other additional regions; and/or enclose any other additional regions of the one or more additional regions.

In some embodiments, the one or more additional regions can be associated with one or more segments (e.g., road segments, street segments, canal segments, and/or sidewalk segments) of a transportation network (e.g., road system, rail system, and/or waterway system). Further, the one or more additional regions can intersect the one or more segments of the transportation network. For example, the one or more additional segments can intersect one or more segments of a transportation network and not intersect regions that do not intersect the one or more segments of the transportation network.

The offline navigation computing system can determine connectivity information which can be based at least in part on network data. The connectivity information can be associated with the state of a communications network (e.g., a wireless communications network) within each of the current region and/or the one or more additional regions. In some embodiments, the connectivity information can be associated with network connectivity (e.g., the availability of a network connection at different locations in the one or more additional regions) available to the navigation device within each of the one or more additional regions. For example, the network data can include a variety of information about the one or more additional regions including network status (e.g., whether a network connection is available within an additional region) within each of the one or more additional regions, and/or the offline map data associated with each of the one or more additional regions.

Further, the connectivity information can indicate an amount of connectivity in portions of the one or more additional regions (e.g., an amount of wireless throughput measured in megabits per second).

When network data for a region is not available, the network connectivity can be determined to be at a default level or default state. The default level or default state can be a predetermined level of connectivity (e.g., a predetermined level of connectivity below a threshold level) or no connectivity (e.g., the region is determined not to have any network connectivity).

The network data can include a variety of information associated with the state of each of the one or more additional regions. In some embodiments, the network data can include information associated with a size of each of the one or more portions of offline map data associated with each of the one or more additional regions (e.g., a size of each of the one or more portions of offline map data in megabits), one or more low connectivity zones (e.g., locations and/or sub-regions within each additional region) in which network throughput is below a network throughput threshold, a signal strength in one or more locations in each of the one or more additional regions, a signal to noise ratio in one or more locations in each of the one or more additional regions, and/or a network throughput in one or more locations in each of the one or more additional regions.

In some embodiments, the connectivity information can be determined based at least in part on use of one or more machine-learned models that have been configured and/or trained to determine the connectivity information based at least in part on input including any portion of the network data. For example, the one or more machine-learned models can be configured to receive an input including network data associated with an additional region (e.g., network data including the locations of geographic barriers within an additional region relative to cellular towers) and generate an output including a likelihood of network throughput being above a threshold level at a set of locations within the additional region.

Determination of connectivity information can include a determination of one or more check-in boundaries. The one or more check-in boundaries can include one or more locations at which the one or more portions of offline map data for a respective region are sent to the navigation device. For example, the check-in boundaries can include a set of geographic coordinates (e.g., latitude, longitude, and/or altitude) within a current region at which one or more portions of offline map data is sent to a navigation device. Furthermore, the one or more check-in boundaries can be associated with the current region and/or each of the one or more additional regions respectively. For example, a current region with adjacent regions can have different check-in boundaries associated with each of the regions (e.g., five adjacent regions can have five different check-in boundaries).

In some embodiments, the one or more check-in boundaries can be based at least in part on the network data associated with the current region. For example, the network data can include information associated with the amount of network throughput at one or more locations within the current region. Based at least in part on a size of the one or more portions of offline map data associated with each of the one or more regions and the throughput at the one or more locations within the current region, an amount of time to send the one or more portions of offline map data can be determined. Based at least in part on the amount of time to send the one or more portions of offline map data, the one or more check-in boundaries associated with each of the one or more additional regions can be determined.

The one or more check-in boundaries can be determined based at least in part on the state of the network (e.g., network connectivity) within the current region and/or any of the one or more additional regions. In some embodiments, the one or more check-in boundaries can be based at least in part on a network throughput associated with one or more locations in each of the one or more additional regions. For example, a check-in boundary for a region can be closer to the edge of an additional region when the throughput is greater at locations between the edge of the region (e.g., the locations at which the additional region and the current region meet) and the current location of the navigation device. Further, the check-in boundary for a region can be further from the edge of the region when the throughput is lower at locations between the edge of the region and the current location of the navigation device.

In some embodiments, the one or more check-in boundaries can be determined based at least in part on a data size of the one or more portions of offline map data associated with each of the one or more additional regions. A greater amount of the one or more portions of offline map data may take longer to send than a smaller amount of the one or more portions of offline map data. For example, given a fixed throughput and holding all other factors equal, a greater amount of data (e.g., offline map data) can take a longer time to send than a smaller amount of data.

The one or more additional regions can be prioritized based at least in part on one or more spatial relationships of the one or more additional regions and/or the one or more check-in boundaries with respect to entities outside the one or more additional regions. In some embodiments, the one or more additional regions can be prioritized based at least in part on the proximity (e.g., a distance in meters) of the navigation device to each of the one or more check-in boundaries. For example, an additional region with a check-in boundary that is closer to the navigation device can be prioritized more highly than an additional region with a check-in boundary that is further away from the navigation device.

In some embodiments, any of the one or more additional regions can be prioritized based at least in part on one or more distances from any portion of the one or more additional regions to one or more points of reference (e.g., one or more locations). The portion of an additional region can include an edge of an additional region (e.g., the edge of the additional region that contacts the current region and/or another additional region), a location inside an additional region (e.g., a location at the center of the additional region or a location within near the edge of an additional region). The one or more points of reference can include any location including: the location of the navigation device; one or more locations of the current region (e.g., a location inside the current region, or a location on the edge of the current region) which can include the location of the navigation device; or outside the current region (e.g., the one or more additional regions and/or other locations not including the one or more additional regions). Further, the one or more points of reference can include a predetermined reference location associated with any set of geographic coordinates including a latitude, longitude, and/or altitude.

The network data can include information associated with one or more dimensions (e.g., the area of an additional region, the perimeter of an additional region, the width of an additional area and/or the length of an additional area) of the current region and/or the one or more additional regions.

Further, the network data can include information associated with one or more spatial relationships (e.g., the relative position, orientation, and/or location) of a current region and/or additional area with respect to the one or more points of reference, the current region, and/or the one or more additional regions. Based at least in part on the one or more dimensions and/or one or more spatial relationships associated with the current region, the one or more additional regions, and/or one or more points of reference, one or more distances between portions of the current region, the one or more additional regions, and/or the one or more points of reference can be determined. The one or more additional regions can then be prioritized based at least in part on any of the one or more distances between the current region, the one or more additional regions, and/or the one or more points of reference.

For example, the offline navigation computing system can prioritize the one or more additional regions based at least in part on the distance between the navigation device and each of the one or more additional regions. By way of further example, the offline navigation computing system can prioritize the one or more additional regions based at least in part on the distance between a portion of the current region (e.g., the center of the current region) and each of the one or more additional regions. Furthermore, the offline navigation computing system can prioritize the one or more additional regions based at least in part on the distance between a point of reference (e.g., a set of geographic coordinates associated with the center of a city) and each of the one or more additional regions.

In some embodiments, factors associated with prioritization of the one or more additional regions (e.g., one or more spatial relationships including distances between additional areas, one or more locations of check-in boundaries, the data size of one or more portions of offline map data associated with one or more additional regions, and/or the size of the one or more regions) can be weighted. Further, the factors associated with the prioritization of the one or more additional regions can be weighted in various ways including: evenly weighted (e.g., a set of factors have the same weight), one factor can have all the weight (e.g., only one factor is used to prioritize the additional regions), or different factors can have a variety of weights (e.g., two factors can have a combined weight that is equal to the weight of a third factor).

In some embodiments, determination of any of the one or more check-in boundaries can include determining an amount of the offline map data that can be sent to the navigation device in a check-in time period based at least in part on an estimated amount of time for the navigation device to travel a certain distance. For example, based at least in part on throughput between the current location and the edge of each of the one or more additional regions and an amount of offline map data associated with each respective additional region, an estimated amount of time to send the one or more portions of offline map data to the navigation device can be determined. The amount of the one or more portions of offline map data that can be sent to the navigation device within the check-in time period can then be used to determine the check-in boundary for the respective additional region.

In some embodiments, the check-in time period can include an amount of time between when the navigation device is located at a nearest check-in boundary of the one or more check-in boundaries and when the navigation device arrives at the region associated with the nearest check-in boundary. Further, the check-in time period can be based at least in part on a velocity of the navigation device, and/or an estimated velocity of the navigation device, when travelling to a check-in boundary and/or region. For example, increasing the velocity of a navigational device can reduce the amount of time (e.g., the check-in time period) required for the navigation device to travel from nearest check-in boundary to the region associated with the nearest check-in boundary.

In some embodiments, the check-in time period can be based at least in part on a predicted velocity of the navigation device. The predicted velocity of the navigation device can be based at least in part on historical device velocity models associated with the velocity of the navigation device in the past (e.g., a model based at least in part on past velocities of the navigation device including past velocities of the navigation device within certain locations and/or regions) and/or aggregate velocity models associated with the velocity of some combination of other devices in the past (e.g., a model based at least in part on past velocities of other devices including past velocities of other devices within certain locations and/or regions).

For example, increasing the velocity of a navigational device can reduce the amount of time (e.g., the check-in time period) required for the navigation device to travel from nearest check-in boundary to the region associated with the nearest check-in boundary.

Determination of the connectivity information can include determining when the one or more additional regions include a foreign region associated with a nationality different from the current location. A foreign region can include: an additional region that has a different nationality from the current region or location; an additional region in a different sub-region (e.g., state, province, or municipality) from the current region or location; and/or an additional region with a different set of network service providers. Further, the foreign region can be a sub-region of an additional region and/or overlap two or more additional regions.

In some embodiments, the connectivity information can be determined based at least in part on aggregated foreign region data including information associated with an aggregated level of connectivity available within the foreign region. For example, the aggregated foreign region data can include an aggregated amount of throughput throughout one or more locations in a foreign region; an indication of network service providers in a foreign region; and/or an indication of whether any network connectivity will be available in a foreign region.

In some embodiments, the aggregated foreign region data can be based at least in part on an average amount of the network connectivity provided by carrier networks within the foreign region. For example, the aggregated foreign region data can include an average network throughput in a foreign region. Further, in some embodiments, the average amount of the network connectivity can be based at least in part on a sample weighted mean of network connectivity within the foreign region.

The offline navigation computing system can prioritize the one or more additional regions. Prioritization of the one or more additional regions can be based at least in part on the connectivity information. For example, the one or more additional regions can be prioritized based at least in part on various prioritization criteria including: network connectivity within each additional region; the size of the one or more portions of offline map data associated with each additional region; the proximity of each additional region to the current location of the navigation device; and/or the proximity of the check-in boundary of each additional region to the current location of the navigation device.

Prioritizing the one or more additional regions can include increasing the priority of the one or more additional regions in which the network connectivity is below a predetermined network connectivity threshold. For example, the additional regions with connectivity below a threshold that allows the one or more portions of offline map data to be sent within a predetermined period of time can have their priority increased.

In some embodiments, prioritizing the one or more additional regions can include determining a data size of each of the one or more portions of offline map data. For example, the data size of the one or more portions of offline map data associated with each of the one or more additional regions can be determined (e.g., a data size in megabits). Further, the one or more additional regions can be prioritized based at least in part on the data size of each of the one or more portions of offline map data. For example, the one or more additional regions with one or more portions of the offline map data with a larger data size can be prioritized more highly than the one or more portions of the offline map data with a smaller data size.

The offline navigation computing system can send one or more portions of offline map data to the navigation device. The one or more portions of offline map data can be associated with the respective one or more additional regions. Further, the one or more portions of offline map data can be sent to the navigation device in an order based at least in part on the priority of the one or more additional regions. For example, the one or more portions of offline map data associated with higher priority additional regions can be sent before the one or more portions of offline map data associated with relatively lower priority additional regions.

In some embodiments, sending the one or more portions of offline map data can include determining a highest priority additional region of the one or more additional regions and sending the one or more portions of offline map data associated with the highest priority additional region to the navigation device when the navigation device arrives at a check-in boundary associated with the highest priority additional region. Furthermore, in some embodiments, the check-in boundary associated with the highest priority additional region can be located at a predetermined distance from a nearest edge of the highest priority additional region.

The disclosed technology can be implemented by a variety of systems associated with communication of data and navigation through an environment. In particular, the disclosed technology can be used as part of a system that includes a source of offline map data (e.g., a remote server) and a navigation device (e.g., a client including a smartphone or in-vehicle navigation system) that are configured to exchange data (e.g., exchange offline data via a wireless network) based on the location of the navigation device.

The disclosed technology can include a computing system (e.g., the offline navigation computing system and/or navigation device) configured to perform various operations associated with the providing and/or retrieving offline map data. In some embodiments, the offline navigation computing system can be associated with various computing systems and/or devices that use, send, receive, and/or generate offline map data. Furthermore, the offline navigation computing system can process, generate, modify, and/or access (e.g., send, and/or receive) data and/or information including data and/or information associated with offline map data including maps of one or more geographic regions.

In some embodiments, the navigation device can perform and/or initiate performance of any of the one or more operations and/or one or more actions performed by the offline navigation computing system. For example, the navigation device can perform one or more operations and/or actions including: sending one or more signals to communicate its location to the offline navigation computing system; sending one or more signals to initiate sending of the one or more portions of offline map data; sending data and/or information associated with the state of the navigation device (e.g., velocity of the navigation device); retrieving data and/or information associated with the state of the one or more additional regions and/or one or more check-in boundaries; and/or performing on device prioritization of one or more additional regions.

The offline navigation computing system and/or the navigation device can include specialized hardware and/or software that enable the performance of one or more operations specific to the disclosed technology. The offline navigation computing system and/or navigation device can include one or more application specific integrated circuits that are configured to perform operations associated with determining the location of a navigation device, determining the connectivity of regions surrounding the navigation device, prioritizing the regions, and sending one or more portions of offline map data to the navigation device.

By way of example, the offline navigation computing system and/or navigation device can be configured to control one or more vehicle systems of a vehicle based at least in part on the one or more portions of offline map data. The one or more vehicle systems can include notification systems and/or vehicle information systems that are used to provide information (e.g., map or navigation information) to a passenger of the vehicle. For example, the offline navigation computing system can provide a map of a geographical area including the one or more additional regions as well as indications of the additional regions in which network connectivity is limited.

Additionally, the offline navigation computing system and/or the navigation device can be configured to generate data used to implement one or more notifications associated with the one or more portions of offline map data. The one or more notifications can include one or more maps of the one or more additional regions, one or more textual descriptions of connectivity within the one or more additional regions, and/or one or more auditory indications associated with the one or more additional regions. For example, a vehicle computing system can generate one or more auditory indications including a ringing sound when a vehicle associated with the offline navigation computing system is approaching an additional region with limited connectivity.

The systems, methods, devices, apparatuses, and tangible non-transitory computer-readable media in the disclosed technology can provide a variety of technical effects and benefits including an improvement in the provision of offline map data for use by a navigation device. In particular, the disclosed technology may assist a user (e.g. a user of a navigation device) in performing technical tasks including receiving offline map data and using the offline map data to navigate through an environment that may include low connectivity regions. The disclosed technology can also provide benefits including improved navigational safety; reduced energy usage and data consumption by the navigation device; and more efficient use of available network resources.

The disclosed technology can improve the effectiveness and safety of navigation by reducing the occurrence of situations in which a user is in a region without available map data. For example, increasing the availability of offline map data in low connectivity regions can reduce the chance that a user will become lost or travel to an unsafe location due to a lack of map data. Further, the effective provision of offline map data provides users of navigation devices with the added convenience of having map data available regardless of network connectivity in their current region as well as regions to which the users are likely to travel.

The disclosed technology can also improve the effectiveness with which network resources are used by more efficiently determining the locations at which offline map data will be sent to a navigation device. More effective determination of connectivity in geographic regions around the current location of a navigation device allows users to be sent offline map data in a proactive manner at locations with sufficient network connectivity and network bandwidth, thereby avoiding being stranded in less favorable regions in which network connectivity is overly stressed or insufficient to provide the offline map data. As such, more effective determination of connectivity and locations to provide offline map data can result in greater availability of network connectivity and more effective bandwidth utilization.

Furthermore, the disclosed technology can improve the efficiency of resource consumption (e.g., reduced battery usage by a navigation device) by providing offline map data at check-in boundaries located in regions where offline map data for reduced connectivity regions can still be provided. For example, the navigation device can save battery resources by receiving portions of map data in a short period of time in a high connectivity region thereby avoiding the battery draining process of slowly receiving portions of map data over a longer period of time in a low connectivity region. Further, the prioritization of offline map data can allow for a reduction in the total amount of offline map data that is sent to the navigation device, thereby reducing its overall rate of data usage.

The disclosed technology can further help to balance the load on a network. In cases where there are a plurality of users traversing regions of both high and low network connectivity, there may be an imbalance between the demands placed on the network and the ability of the network to actually service those demands; this problem may be particularly acute when there are multiple users present within a region of low connectivity, with each user requesting map data for that region. The disclosed technology can help to address this imbalance by ensuring that requests for map data pertaining to regions of low network connectivity are received and serviced whilst users are still present within an area of higher network connectivity. In this way, the disclosed technology can help to rebalance the load by shifting the volume of requests for map data to regions of higher network connectivity, thereby ensuring an overall more efficient use of available network resources.

The disclosed technology can allow the user of a navigation device to more effectively perform the technical task of providing offline map data for geographic regions in which network connectivity may be low. As a result, users are provided with the specific benefits of improved safety, reduced network bandwidth utilization, and more efficient use of device resources. Further, any of the specific benefits provided to users can be used to improve the effectiveness of a wide variety of devices and services including navigation devices and/or navigation services in which offline map data is provided. Accordingly, the improvements offered by the disclosed technology can result in tangible benefits to a variety of devices and/or systems including mechanical, electronic, and computing systems associated with navigation and/or providing offline maps.

With reference now to FIGS. 1-11, example embodiments of the present disclosure will be discussed in further detail. FIG. 1 depicts a diagram of an example system according to example embodiments of the present disclosure. The system 100 includes a computing device 102, a computing system 130, a training computing system 150, and one or more remote computing systems 170 that are communicatively connected and/or coupled over a network 180.

The computing device 102 can include one or more processors 112 and a memory 114. The one or more processors 112 can include any suitable processing device (e.g., a processor core, a microprocessor, an application specific integrated circuit (ASIC), a field programmable gate array (FPGA), a controller, and/or a microcontroller) and can be one processor or a plurality of processors that are operatively connected. The memory 114 can include one or more non-transitory computer-readable storage mediums, including RAM, NVRAM, ROM, EEPROM, EPROM, flash memory devices, magnetic disks, and combinations thereof. The memory 114 can store data 116 and instructions 118 which are executed by the processor 112 to cause the computing device 102 to perform one or more operations. In some embodiments, the data 116 can include: network data that can include information associated with the state of a communications network in a current region (e.g., a region in which the computing device 102 is located) and/or one or more additional regions (e.g., geographic regions); and/or offline map data that can include information associated with the state (e.g., location, dimensions, and/or type of geographical features including roads, sidewalks, bridges, tunnels, buildings, and/or waterways) of one or more geographic regions. In some embodiments, the computing device 102 can include any of the attributes and/or capabilities of the computing system 130 and can perform one or more operations including any of the operations performed by the computing system 130.

The computing device 102 can be implemented in and/or include any type of computing device, including, for example, a navigation device (e.g., a computing device configured to perform any operations described herein including one or more operations associated with navigation, network data, and/or offline map data), a personal computing device (e.g., laptop computing device or desktop computing device), a mobile computing device (e.g., smartphone or tablet), a navigation device (e.g., a computing device configured to determine its location), a controller, a wearable computing device (e.g., a smart watch), and/or an embedded computing device.

Further, the computing device 102 can be configured to perform one or more operations including: determining a current region associated with a current location of the computing device 102; determining predicted travel locations from the current region based at least in part on aggregated travel data; determining one or more additional regions associated with the current region based at least in part on the current region and the predicted travel destinations; determining connectivity information based at least in part on network data; prioritizing the one or more additional regions based at least in part on the connectivity information; and sending one or more portions of offline map data associated with the respective one or more additional regions to the navigation device in an order based at least in part on the priority of the one or more additional regions.

In some embodiments, the computing device 102 can perform one or more operations including determining one or more check-in boundaries associated with each of one or more additional regions respectively. Further, the computing device 102 can determine when the one or more additional regions includes a foreign region; and determine connectivity information based at least in part on aggregated foreign region data associated with the foreign region.

In some implementations, the computing device 102 can implement and/or include one or more machine-learned models 120. For example, the one or more machine-learned models 120 can include various machine-learned models including neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks, and/or other forms of neural networks. Examples of the one or more machine-learned models 120 are discussed with reference to FIGS. 1-11.

In some implementations, the one or more machine-learned models 120 can be received from the computing system 130 (e.g., a server computing system) over network 180, stored in the computing device memory 114, and then used or otherwise implemented by the one or more processors 112. In some implementations, the computing device 102 can implement multiple parallel instances of a single machine-learned model of the one or more machine learned models 120 (e.g., to determine one or more additional regions, predict travel destinations, or determine one or more check-in boundaries, for one or more navigation devices across multiple instances of the machine-learned model 120). More particularly, the one or more machine-learned models 120 can be configured and/or trained to perform any of the operations performed by the computing system 130.

Additionally, or alternatively, one or more machine-learned models 140 can be included in or otherwise stored and implemented by the computing system 130 that communicates with the computing device 102, for example, according to a client-server relationship. For example, the machine-learned models 140 can be implemented by the computing system 130 as a portion of a web service (e.g., an offline map data provision service). Thus, one or more machine-learned models 120 can be stored and implemented at the computing device 102 and/or one or more machine-learned models 140 can be stored and implemented at the computing system 130.

The computing device 102 can also include one or more of the user input component 122 that can receive user input. For example, the user input component 122 can be a touch-sensitive component (e.g., a touch-sensitive display screen or a touch pad) that is sensitive to the touch of a user input (e.g., a finger and/or a stylus). The touch-sensitive component can serve to implement a virtual keyboard. Other example user input components include a microphone, a mechanical keyboard, an electromechanical keyboard, and/or other means by which a user can provide user input.

The computing system 130 can include one or more processors 132 and a memory 134. The one or more processors 132 can include any suitable processing device (e.g., a processor core, a microprocessor, an ASIC, a FPGA, a controller, and/or a microcontroller) and can include one processor or a plurality of processors that are operatively connected. The memory 134 can include one or more non-transitory computer-readable storage mediums, including RAM, ROM, EEPROM, EPROM, flash memory devices, magnetic disks, and combinations thereof. The memory 134 can store data 136 and instructions 138 which are executed by the processor 132 to cause the computing system 130 to perform operations. In some embodiments, the data 136 can include: network data that can include information associated with the state of a communications network in one or more additional regions; and/or offline map data that can include information associated with the state (e.g., location, dimensions, and/or type of geographical features including roads, sidewalks, bridges, tunnels, buildings, and/or waterways) of one or more geographic regions.

Furthermore, in some embodiments, the computing system 130 can be configured to perform the operations of a server computing device including sending and/or receiving data including network data and/or one or more portions of offline map data to and/or from one or more computing devices and/or computing systems including the computing device 102, the training computing system 150, and/or the remote computing system 170. In some embodiments, the computing system 130 can include any of the attributes and/or capabilities of the computing device 102 and can perform one or more operations including any of the operations performed by the computing device 102.

Further, the computing system 130 can be implemented in and/or include any type of computing system, including, for example, an offline navigation computing system (e.g., a computing system configured to perform any operations described herein including one or more operations associated with navigation, network data, and/or offline map data), a personal computing device (e.g., laptop computing device or desktop computing device), a mobile computing device (e.g., smartphone or tablet), a server computing system (e.g., a computing system configured to provide data including network data, aggregated travel data, and/or offline map data), and/or a controller.

In some implementations, the computing system 130 includes and/or is otherwise implemented by one or more server computing devices. In instances in which the computing system 130 includes plural server computing devices, such server computing devices can operate according to sequential computing architectures, parallel computing architectures, or some combination thereof.

As described above, the computing system 130 can store or otherwise include the one or more machine-learned models 140. For example, the one or more machine-learned models 140 can include various machine-learned models. Example machine-learned models include neural networks or other multi-layer non-linear models. Example neural networks include feed forward neural networks, deep neural networks, recurrent neural networks, and convolutional neural networks. Examples of the one or more machine-learned models 140 are discussed with reference to FIGS. 1-11.

The computing device 102 and/or the computing system 130 can train the one or more machine-learned models 120 and/or 140 via interaction with the training computing system 150 that is communicatively connected and/or coupled over the network 180. The training computing system 150 can be separate from the computing system 130 or can be a portion of the computing system 130.

The training computing system 150 includes one or more processors 152 and a memory 154. The one or more processors 152 can be any suitable processing device (e.g., a processor core, a microprocessor, an ASIC, a FPGA, a controller, and/or a microcontroller) and can be one processor or a plurality of processors that are operatively connected. The memory 154 can include one or more non-transitory computer-readable storage mediums, including RAM, ROM, EEPROM, EPROM, flash memory devices, magnetic disks, and combinations thereof. The memory 154 can store data 156 and instructions 158 which are executed by the processor 152 to cause the training computing system 150 to perform operations. In some embodiments, the data 156 can include: network data that can include information associated with the state of a communications network in one or more additional regions; and/or offline map data that can include information associated with the state. In some implementations, the training computing system 150 includes or is otherwise implemented by one or more server computing devices.

The training computing system 150 can include a model trainer 160 that trains the one or more machine-learned models 120 and/or the one or more machine-learned models 140 respectively stored at the computing device 102 and/or the computing system 130 using various training or learning techniques, including, for example, backwards propagation of errors. In some implementations, performing backwards propagation of errors can include performing truncated backpropagation through time. The model trainer 160 can perform a number of generalization techniques (e.g., weight decays and/or dropouts) to improve the generalization capability of the models being trained.

In particular, the model trainer 160 can train the one or more machine-learned models 120 and/or the one or more machine-learned models 140 based on a set of training data 162. The training data 162 can include, for example, any network data which can include information associated with the state of networks (e.g., communications networks) in one or more geographic regions; and aggregated travel data including information associated with previous travel destinations and previously locations of one or more computing devices (e.g., navigation devices) in the past. For example, the training data can include the network connectivity associated with a geographic region, the size of a geographic region, the size of offline map data associated with a geographic region, the relative location of geographic regions, previous travel destinations, weather patterns in a geographic region, and/or previous travel paths through geographic regions. The one or more machine-learned models 120 and/or the one or more machine-learned models 140 can be configured and/or trained to perform any of the one or more operations performed by the computing device 102 and/or the computing system 130. For example, the one or more machine-learned models 120 can be configured and/or trained to perform various operations including: determining connectivity information (e.g., network throughput and/or network connection availability) within an additional region; and/or making one or more predictions including the predicted travel destinations of a navigation device based at least in part on input including previous travel destinations from a region (e.g., the current region in which the computing device 102 is located).

In some implementations, if the user has provided consent, the training examples can be provided by the computing device 102. Thus, in such implementations, the one or more machine-learned models 120 provided to the computing device 102 can be trained by the training computing system 150 based at least in part on user-specific data received from the computing device 102 including: previously visited locations and/or previous travel destinations of the computing device 102 including the associated latitudes, longitudes, and/or altitudes of the locations; and/or network data (e.g., network throughput) associated with previous travel destinations and/or previously visited locations.

The model trainer 160 can include computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium including RAM hard disk or optical or magnetic media.

Each of the one or more remote computing systems 170 can include one or more processors 172 and a memory 174. The one or more processors 172 can include any suitable processing device (e.g., a processor core, a microprocessor, an ASIC, a FPGA, a controller, and/or a microcontroller) and can include one processor or a plurality of processors that are operatively connected. The memory 174 can include one or more non-transitory computer-readable storage mediums, including RAM, ROM, EEPROM, EPROM, flash memory devices, magnetic disks, and combinations thereof. The memory 174 can store data 176 and instructions 178 which are executed by the processor 172 to cause the remote computing system 170 to perform operations.

In some implementations, the one or more remote computing systems 170 include or are otherwise implemented by one or more computing devices. In instances in which the one or more remote computing systems 170 includes plural computing devices, such computing devices can operate according to sequential computing architectures, parallel computing architectures, and/or some combination thereof. Furthermore, the one or more remote computing systems 170 can be used to collect, generate, send, and or receive one or more signals and/or data including network data, aggregated travel data, and/or map data (e.g., information associated with the natural and artificial geographic features of a region) which can be used as a basis for one or more portions of offline map data. The one or more remote computing systems 170 can include a smart phone device that a user of the smart phone device can use to generate navigation data associated with one or more geographic regions through which the user travels.

For example, the user of the smart phone device can record the latitude, longitude, and/or altitude of one or more locations through which the user travels. The one or more locations can be associated with network connectivity information at each of the one or more locations, which can then be aggregated with the network connectivity information of other users travelling in the same locations and/or nearby locations. The network connectivity information can be used as part of network data for the region in which the user and other users have travelled. Further, the one or more locations travelled by the smart phone device can be used to provide information on previous travel destinations that can be used to predict travel destinations at a later time. The information from the smart phone device can then be sent to the one or more remote computing systems 170 which can include a repository that can be used to store network data including the user provided network connectivity information. In some embodiments, the user provided data can be strongly encrypted, anonymized (e.g., any personal information or other information associated with the user's identity is either not collected or is deleted after being received), and maintained in a secure and privacy enhancing way for use by the one or more remote computing systems 170 which can provide the network data for use by other computing devices and/or systems including those described herein.

The network 180 can include any type of communications network, including a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well. For example, in some implementations, the computing device 102 and/or the computing system 130 can include the model trainer 160 and the training data 162. In such implementations, the one or more machine-learned models 120 can be both trained and used locally at the computing device 102 and/or the computing system 130. In some such implementations, the computing device 102 and/or the computing system 130 can implement the model trainer 160 to personalize the one or more machine-learned models 120 based on user-specific data.

FIG. 2 depicts a diagram of an example device according to example embodiments of the present disclosure. A computing device 200 can include one or more attributes and/or capabilities of the computing device 102, the computing system 130, the training computing system 150, and/or the one or more remote computing systems 170. Furthermore, the computing device 200 can perform one or more actions and/or operations including the one or more actions and/or operations performed by the computing device 102, the computing system 130, the training computing system 150, and/or the one or more remote computing systems 170, which are depicted in FIG. 1.

As shown in FIG. 2, the computing device 200 can include one or more memory devices 202, network data 204, offline map data 206, one or more interconnects 210, one or more processors 220, a network interface 222, one or more mass storage devices 224, one or more output devices 226, one or more sensors 228, one or more input devices 230, and/or the location device 232.

The one or more memory devices 202 can store information and/or data (e.g., the network data 204, the offline map data 206, and/or the aggregated travel data 208). Further, the one or more memory devices 202 can include one or more non-transitory computer-readable storage mediums, including RAM, ROM, EEPROM, EPROM, flash memory devices, magnetic disks, and combinations thereof. The information and/or data stored by the one or more memory devices 202 can be executed by the one or more processors 220 to cause the computing device 200 to perform operations.

The network data 204 can include one or more portions of data (e.g., the data 116, the data 136, the data 156, and/or the data 176 which are depicted in FIG. 1) and/or instructions (e.g., the instructions 118, the instructions 138, the instructions 158, and/or the instructions 178 which are depicted in FIG. 1) that are stored in the memory 114, the memory 134, the memory 154, and/or the memory 174 respectively. Furthermore, the network data 204 can include information associated with network connectivity within a current region and/or one or more additional regions.

The offline map data 206 can include one or more portions of the data 116, the data 136, the data 156, and/or the data 176 which are depicted in FIG. 1 and/or instructions (e.g., the instructions 118, the instructions 138, the instructions 158, and/or the instructions 178 which are depicted in FIG. 1) that are stored in the memory 114, the memory 134, the memory 154, and/or the memory 174 respectively. Furthermore, the offline map data 206 can include information associated with maps of one or more geographic regions.

The aggregated travel data 208 can include one or more portions of the data 116, the data 136, the data 156, and/or the data 176 which are depicted in FIG. 1 and/or instructions (e.g., the instructions 118, the instructions 138, the instructions 158, and/or the instructions 178 which are depicted in FIG. 1) that are stored in the memory 114, the memory 134, the memory 154, and/or the memory 174 respectively. Furthermore, the aggregated travel data 208 can include information associated with previous travel destinations and/or travel routes of one or more devices (e.g., navigation devices and/or vehicles) associated with one or more geographic regions. In some embodiments, the aggregated travel data 208 can be received from one or more computing systems (e.g., the computing system 130 that is depicted in FIG. 1).

The one or more interconnects 210 can include one or more interconnects or buses that can be used to send and/or receive one or more signals (e.g., electronic signals) and/or data (e.g., the network data 204 and/or the offline map data 206) between components of the computing device 200, including the one or more memory devices 202, the one or more processors 220, the network interface 222, the one or more mass storage devices 224, the one or more output devices 226, the one or more sensors 228 (e.g., sensor array), and/or the one or more input devices 230. The one or more interconnects 210 can be arranged or configured in different ways including as parallel or serial connections. Further the one or more interconnects 210 can include one or more internal buses to connect the internal components of the computing device 200; and one or more external buses used to connect the internal components of the computing device 200 to one or more external devices. By way of example, the one or more interconnects 210 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the network data 204, the offline map data 206, and/or the aggregated travel data 208. The one or more processors 220 can include single or multiple core devices including a microprocessor, microcontroller, integrated circuit, and/or logic device.

The network interface 222 can support network communications. For example, the network interface 222 can support communication via networks including a local area network and/or a wide area network (e.g., the Internet). The one or more mass storage devices 224 (e.g., a hard disk drive and/or a solid state drive) can be used to store data including the network data 204 and/or the offline map data 206. The one or more output devices 226 can include one or more display devices (e.g., LCD display, OLED display, and/or CRT display), one or more light sources (e.g., LEDs), one or more loud speakers, and/or one or more haptic output devices.

The one or more input devices 230 can include one or more keyboards, one or more touch sensitive devices (e.g., a touch screen display), one or more buttons (e.g., ON/OFF buttons and/or YES/NO buttons), one or more microphones, and/or one or more cameras.

The one or more memory devices 202 and the one or more mass storage devices 224 are illustrated separately, however, the one or more memory devices 202 and the one or more mass storage devices 224 can be regions within the same memory module. The computing device 200 can include one or more additional processors, memory devices, network interfaces, which may be provided separately or on a same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. The one or more memory devices 202 can be used to operate various applications including a mobile operating system developed specifically for mobile devices. As such, the one or more memory devices 202 can store instructions that allow the software applications to access data including wireless network parameters (e.g., identity of the wireless network, quality of service), and invoke various services including telephony, location determination (e.g., via global positioning system (GPS) or WLAN), and/or wireless network data call origination services. In other embodiments, the one or more memory devices 202 can be used to operate or execute a general-purpose operating system that operates on both mobile and stationary devices, such as smartphones and desktop computers, for example.

The software applications that can be operated or executed by the computing device 200 can include applications associate with the system 100 shown in FIG. 1. Further, the software applications that can be operated and/or executed by the computing device 200 can include native applications and/or web-based applications.

The location device 232 can include one or more devices or circuitry for determining the position of the computing device 200. For example, the location device 232 can an determine actual and/or relative position of the computing device 200 by using a satellite navigation positioning system (e.g. a GPS system, a Galileo positioning system, the GLObal Navigation satellite system (GLONASS), the Bei-Dou Satellite Navigation and Positioning system), an inertial navigation system, a dead reckoning system, based on IP address, by using triangulation and/or proximity to cellular towers or Wi-Fi hotspots, beacons, and the like and/or other suitable techniques for determining position.

Figure 3:
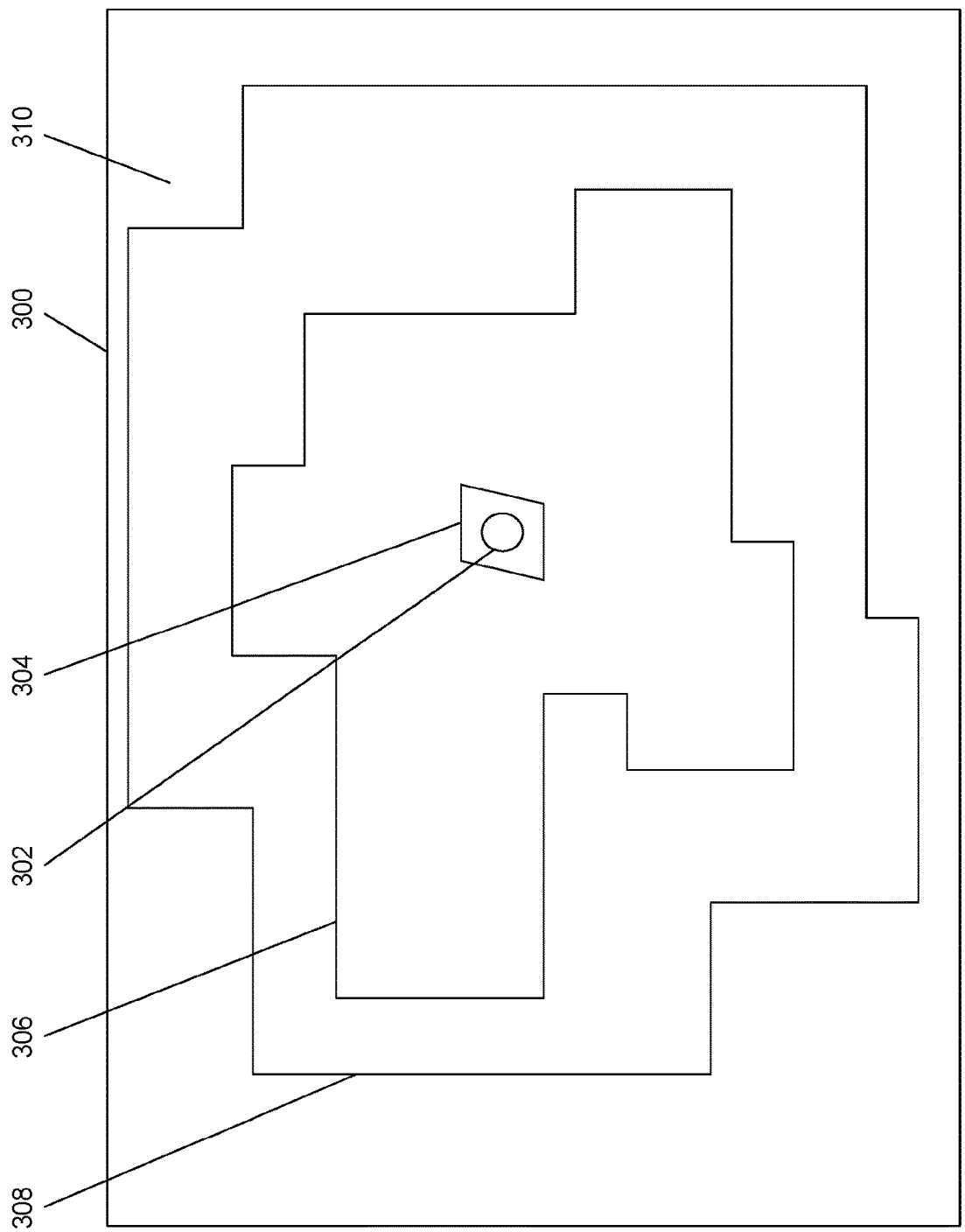
FIG. 3 depicts an example of region determination in an environment according to example embodiments of the present disclosure.

FIG. 3 depicts an example of region determination in an environment according to example embodiments of the present disclosure. Any operations and/or actions performed in an environment 300 (depicted in FIG. 3) can be performed by a computing device and/or computing system that includes one or more attributes and/or capabilities of the computing device 102, the computing system 130, the training computing system 150, and/or the one or more remote computing systems 170. As shown in FIG. 3, the environment 300 includes a navigation device 302, a sub-region 304, a current region 306, an additional region 308, and one or more additional regions 310.

The environment 300 can include any geographical region, for example a conurbation including a central urban region immediately surrounded by suburban regions which are in turn surrounded by more rural regions. Further, the environment 300 can include a plurality of regions, each of which can be associated with a respective regional population distribution and/or associated amount of map data (e.g., offline map data). In some embodiments, the population density of a region is positively correlated with the density of data used to map the region. For example, regions with a greater population density (e.g., urban regions) may be positively correlated with a greater density of data (e.g., a greater amount of offline map data per unit of area) used to map the region.

In this example, the navigation device 302 (e.g., a computing device including any of the attributes and/or capabilities of the computing device 102 depicted in FIG. 1) is located within the sub-region 304 (e.g., a geographic sub-region associated with an S2 cell) which is within the current region 306 (e.g., a geographic region for which the navigation device 302 has received offline map data that describes the geographic region). The size and/or shape of the current region 306 can be based at least in part on the state of surrounding regions of the environment 300 (e.g., the additional region 308 and/or the one or more additional regions 310) including: an availability of network connections in surrounding regions of the environment 300, the network throughput in surrounding regions of the environment 300, and/or the proximity of surrounding regions of the environment 300.

Figure 4:
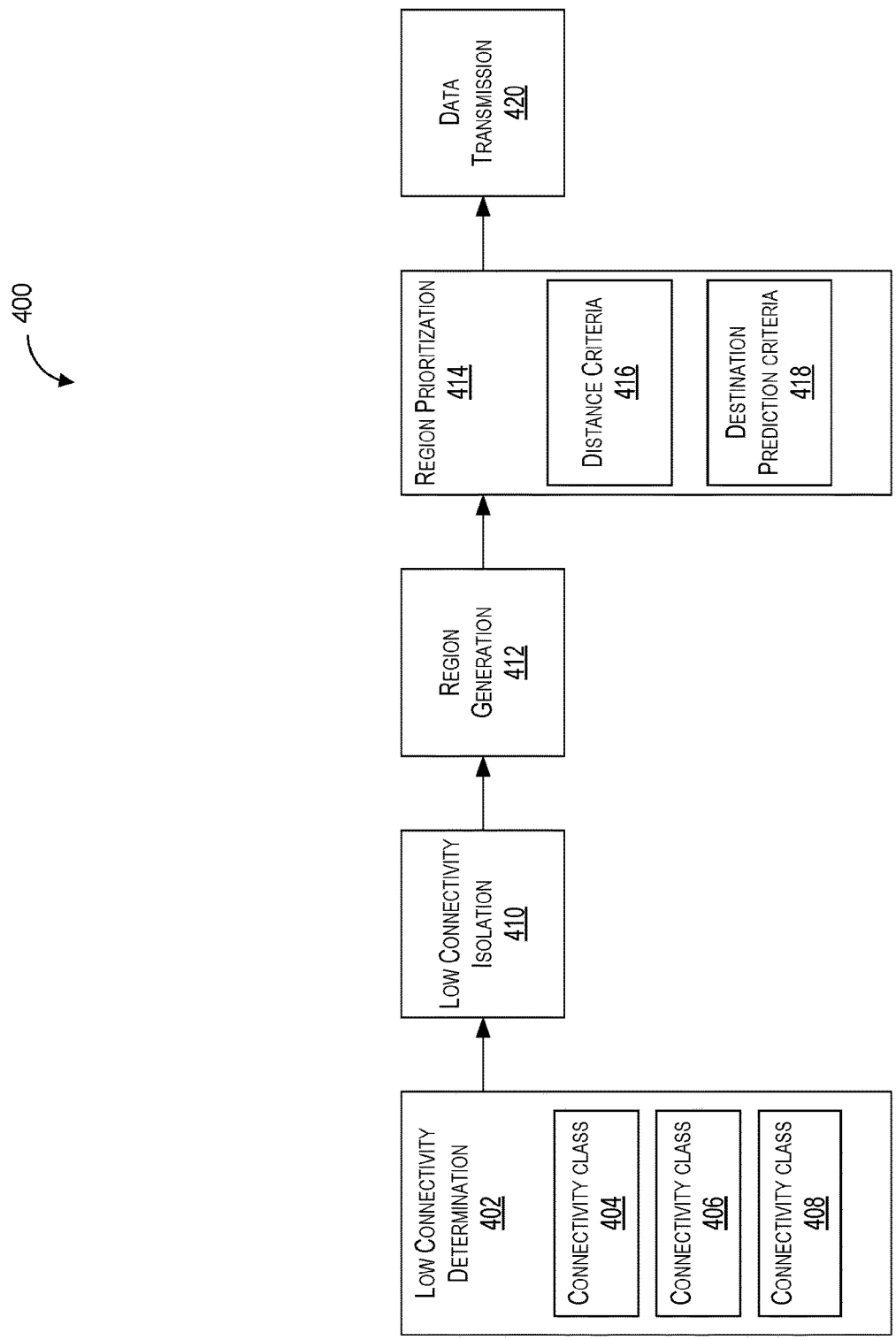
FIG. 4 depicts an example of a technique for prioritizing regions and transmitting offline map data according to example embodiments of the present disclosure.

FIG. 4 depicts an example of a technique for prioritizing regions and transmitting offline map data according to example embodiments of the present disclosure. Any operations and/or actions performed in the technique 400 (depicted in FIG. 4) can be performed by a computing device and/or computing system that includes one or more attributes and/or capabilities of the computing device 102, the computing system 130, the training computing system 150, and/or the one or more remote computing systems 170. As shown in FIG. 4, the technique 400 includes low connectivity determination 402, connectivity class 404, connectivity class 406, connectivity class 408, low connectivity isolation 410, region generation 412, region prioritization 414, distance criteria 416, destination prediction criteria 418, and data transmission 420.

Low connectivity determination 402 can include one or more operations in which connectivity, including low connectivity, in a plurality of sub-regions (e.g., S2 cells) of a region (e.g., a geographic region) is determined. For example, the low connectivity determination 402 can include a computing system (e.g., the computing system 130) accessing one or more sources of network data to determine the connectivity in each of a plurality of sub-regions. In some embodiments, each of the plurality of sub-regions can include smaller sub-units, and each region can include a combination of sub-regions of different sizes.

Each of the plurality of sub-regions can be classified based at least in part on their respective connectivity. In this example, the classifications of the sub-regions can include: connectivity class 404 which is a sub-region with no data; connectivity class 406 which is a sub-region with no connectivity measurements; or connectivity class 408 which is a sub-region with low network throughput.

The connectivity class 404 can be associated with sub-regions in which there is no available data (e.g., offline map data and/or network data) associated with the connectivity of the sub-region or in which the amount of available data for the sub-region is below a predetermined threshold (e.g., the number of observations of connectivity in the sub-region is below a threshold). When the sub-region is classified as connectivity class 404, the sub-region can be determined to have a default amount of connectivity. For example, sub-regions that are associated with connectivity class 404 can be determined to have no network connectivity.

The connectivity class 406 can be associated with sub-regions in which the available data (e.g., offline map data and/or network data) associated with the connectivity of the sub-region indicates that there is no available data or that the amount of available data for the sub-region is below a predetermined threshold. For example, the sub-regions in connectivity class 406 can include tunnels, parking garages, and/or other sub-regions that network signals do not penetrate.

The connectivity class 408 can be associated with sub-regions in which the throughput of data (e.g., average throughput) is within a predetermined range that is determined to be low throughput. A sub-region associated with the connectivity class 408 may have a mixture of high throughput and/or low throughput areas, with an average throughput that is within the low throughput range.

Any remaining sub-regions that are not classified as belonging to connectivity classes 404-408, can be determined to be regions of high connectivity (e.g., high network throughput sub-regions).

Low connectivity isolation 410 can include determining the sub-regions associated with connectivity classes 404-408 that are surrounded by high connectivity sub-regions that would result in high connectivity within the region with which the sub-regions are associated (e.g., a region including some of the sub-regions). In this way, sub-regions that exist within on-average high network throughput regions can be isolated. For example, parks, ponds, tunnels, parking garages, and other sub-regions with low connectivity that are often present within high connectivity urban regions can be filtered.

Region generation 412 can include the generation of a plurality of regions (e.g., additional regions) based at least in part on a predetermined data size that is used to determine the physical size (e.g., square kilometers) of each of the plurality of regions. Accordingly, a region that includes many low network throughput sub-regions and no high network throughput sub-regions will be larger in size (e.g., geographical area) and lower in data density (e.g., $KB/km^2$) than a region that only has high network throughput sub-regions. Further, the plurality of regions can be various shapes including polygonal (e.g., rectangular, square, or irregular shaped polygon), or non-polygonal shapes.

Region prioritization 414 can include one or more operations to prioritize or rank the regions based on some criteria including distance criteria 416 or destination prediction criteria 418. The distance criteria 416 can include a prioritization of regions around the current region associated with a navigation device (e.g., the computing device 102) based at least in part on the distance of the regions from the current region. Regions that are further away from the current region can be assigned a lower priority than regions that are closer to the current region.

The destination prediction criteria 418 can include prioritization of additional regions based at least in part on predicted travel destinations from the current region. For example, a computing system can access aggregated travel data that includes previous travel destinations from the plurality of regions. The aggregated travel data can be used to predict travel destinations which can be prioritized based at least in part on the frequency with which each predicted travel destination was travelled to from the current region. For example, the previous travel destinations may indicate that immediately adjacent regions are not directly connected by a road and are not predicted travel destinations despite being closer to the current region than other regions.

Data transmission 420 can include one or more operations to send data (e.g., offline map data) including information associated with the prioritized regions to one or more devices including a navigation device. In some embodiments, the data transmission 420 can include periodically sending data based at least in part on the priority of the regions.

Figure 5:
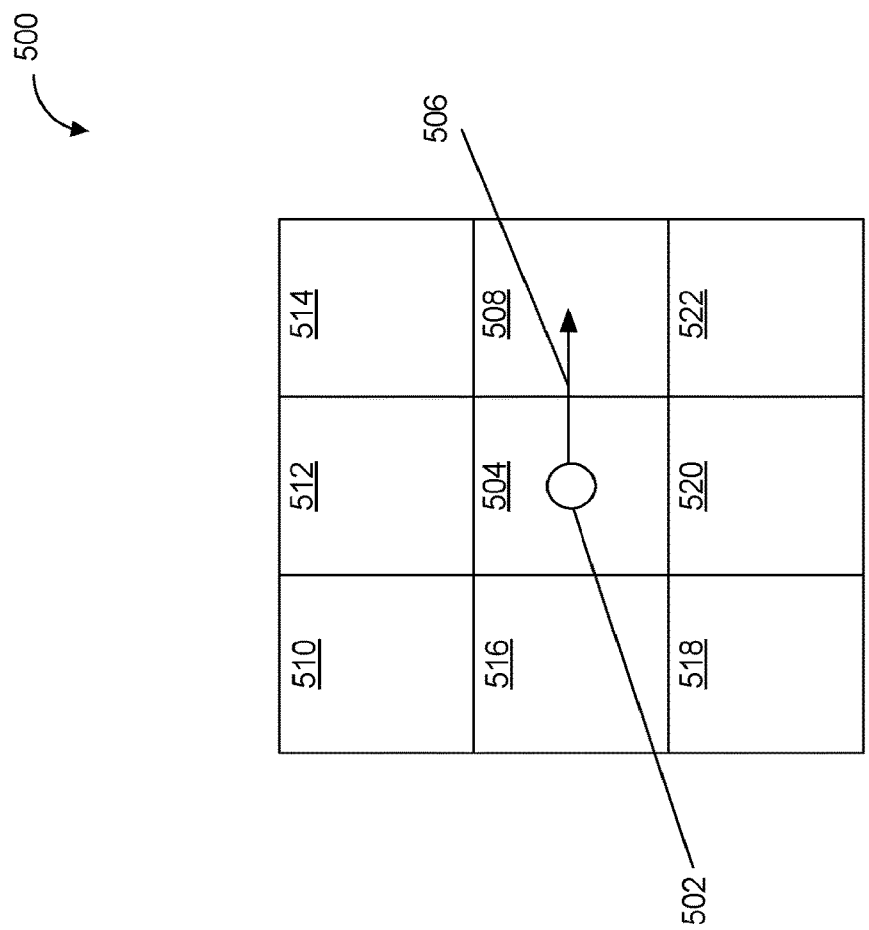
FIG. 5 depicts an example of region prioritization according to example embodiments of the present disclosure.

FIG. 5 depicts an example of region prioritization according to example embodiments of the present disclosure. Any operations and/or actions performed in a plurality of regions 500 (depicted in FIG. 5) can be performed by a computing device and/or computing system that includes one or more attributes and/or capabilities of the computing device 102, the computing system 130, the training computing system 150, and/or the one or more remote computing systems 170. As shown in FIG. 5, the plurality of regions 500 include a navigation device 502, a current region 504, a direction of travel 506, an additional region 508, an additional region 510, an additional region 512, an additional region 514, an additional region 516, an additional region 518, an additional region 520, and an additional region 522.

In this example, the navigation device 502 (e.g., a computing device including any of the attributes and/or capabilities of the computing device 102) is located within the current region 504 (e.g., a geographic region within the larger geographic region of the region 500). The current region 504 and/or each of the additional regions 508-522 can be associated with a corresponding amount of data (e.g., a portion of offline map data) that includes information describing spatial relationships and/or features of the respective region including the spatial relationships and/or features of roadways, buildings, waterways, and natural geographic features. Further, the current region 504 and/or each of the additional regions 508-522 can be associated with network connectivity within the region including network throughput within each respective region.

The navigation device 502 can travel in various directions including one of eight combined cardinal and intercardinal directions to any of the regions 508-522 respectively. In one example the navigation device 502 can travel in the direction of travel 506 from the current region 504 to the additional region 508. The amount of data (e.g., one or more portions of offline map data) that can be sent to the navigation device 502 before the navigation device arrives at the additional region 508 can be based at least in part on the amount of time for the navigation device 502 to travel to the additional region 508 and network throughput between the current location of the navigation device 502 and the edge between the current region 504 and the additional region 508.

Figure 6:
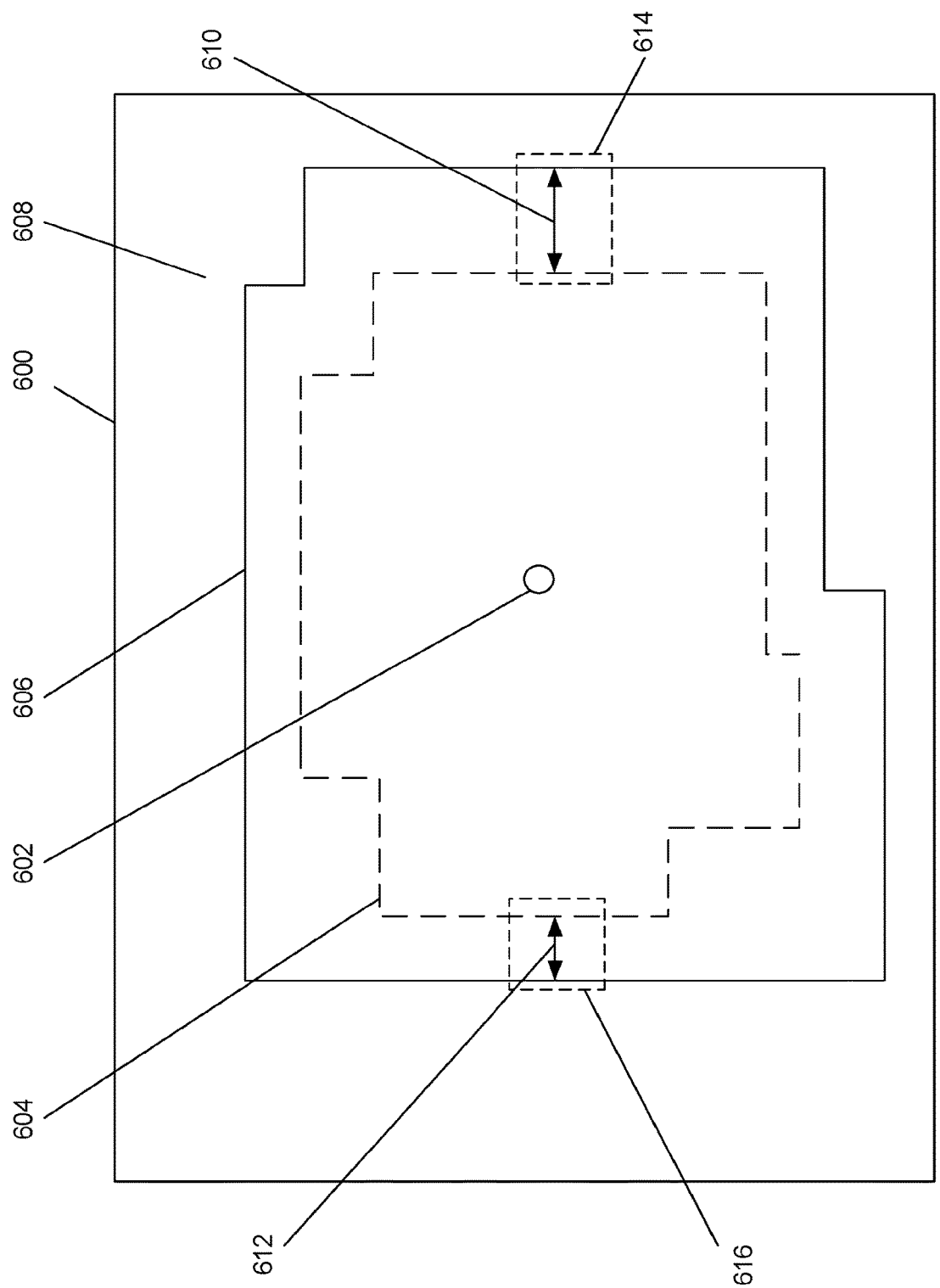
FIG. 6 depicts an example of check-in boundary determination in an environment according to example embodiments of the present disclosure.

FIG. 6 depicts an example of check-in boundary determination in an environment according to example embodiments of the present disclosure. Any operations and/or actions performed in an environment 600 (depicted in FIG. 6) can be performed by a computing device and/or computing system that includes one or more attributes and/or capabilities of the computing device 102, the computing system 130, the training computing system 150, and/or the one or more remote computing systems 170. As shown in FIG. 6, the environment 600 includes a navigation device 602, a check-in boundary 604, a current region 606, one or more additional regions 608, a distance 610, a distance 612, a sub-region 614, and a sub-region 616.

In this example, the navigation device 602 (e.g., the computing device 102) is located within the current region 606. The check-in boundary 604 indicates the location within the current region 606 in which the navigation device 602 will be sent (e.g., sent from the computing system 130) one or more portions of offline map data. In some embodiments, a distance between the edge of the current region 606 and the closest portion of the check-in boundary 604 can be positively correlated with the amount of offline map data associated with the one or more additional regions 608 adjacent to the respective portion of the check-in boundary 604; and/or inversely associated with network throughput in the one or more additional regions 608 adjacent to the respective portion of the check-in boundary 604.

For example, the distance 610 is greater than the distance 612, which can indicate that a greater amount of offline map data is associated with the one or more additional regions adjacent to the sub-region 614 than the one or more additional regions 608 adjacent to the sub-region 616. By way of further example, the distance 610 is greater than the distance 612, which can indicate that a lower network throughput is associated with the one or more additional regions adjacent to the sub-region 614 than the one or more additional regions 608 adjacent to the sub-region 616.

Figure 7:
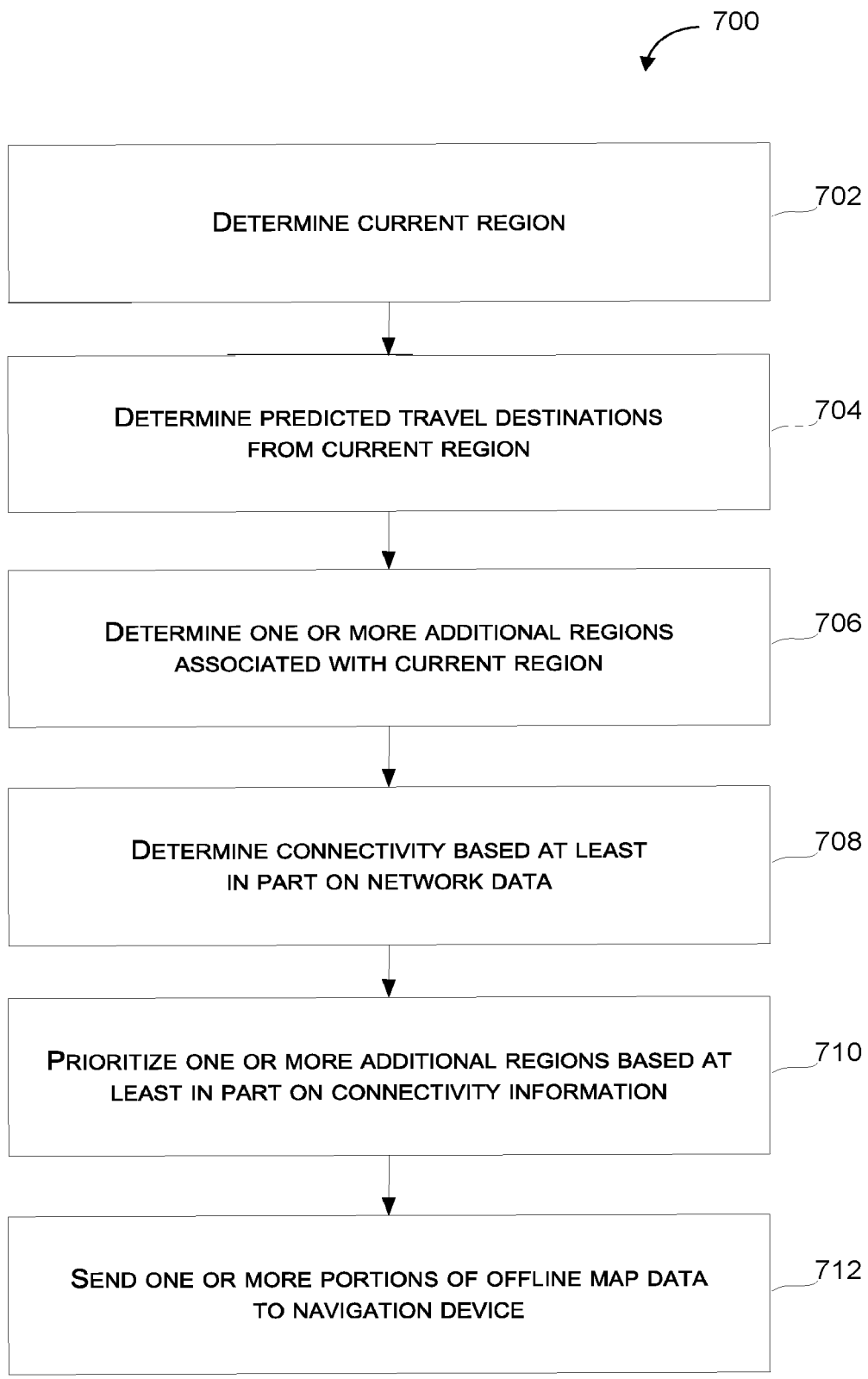
FIG. 7 depicts a flow diagram of dynamic offline map provision and retrieval according to example embodiments of the present disclosure.

FIG. 7 depicts a flow diagram of dynamic offline map provision and retrieval according to example embodiments of the present disclosure. One or more portions of the method 700 can be executed and/or implemented on one or more computing devices or computing systems including, for example, the computing device 102, the computing system 130, the training computing system 150, and/or the remote computing system 170. Further, one or more portions of the method 700 can be executed or implemented as an algorithm on the hardware devices or systems disclosed herein. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 702, the method 700 can include determining a current region. The current region can be associated with a current location of a navigation device. For example, a computing system (e.g., the computing system 130) can receive one or more signals (e.g., wireless signals) from the navigation device (e.g., the computing device 102) which can be configured to determine its own location. The one or more signals can include information associated with the location of the navigation device that are sent from the navigation device to the computing system. The computing system can then use the location of the navigation device to define a current region around the location. The current region can, for example, include: a predetermined radius around the current location of the navigation device; an region with a predetermined shape (e.g., a square) that has the current location at its center; and/or a region that is part of a set of predefined regions that can have different sizes and/or shapes that were previously determined by the computing system.

In some embodiments, the navigation device and a computing system can interact in a client-server relationship in which signals and/or data are communicated between the client device (e.g., the navigation device) that requests data and the server device (e.g., the computing system) that sends the data to the navigation device.

At 704, the method 700 can include determining predicted travel destinations. The predicted travel destinations can include travel destinations from the current region. The predicted travel destinations can be based at least in part on aggregated travel data. Further, the aggregated travel data can include the previous travel destinations from within the current region. For example, a computing system (e.g., the computing system 130) and/or the navigation device (e.g., the computing device 102) can access the aggregated travel data associated with the current location of the navigation device (e.g., the computing device 102) to determine the predicted travel destinations from the current location. Further, the predicted travel destinations can include travel paths (e.g., a set of locations) from the current location to the predicted travel destinations. In some embodiments, the computing system can send one or more portions of the aggregated travel data to the navigation device, which can perform one or more operations to determine the predicted travel destinations from the current location.

In some embodiments, the computing device and/or the navigation device can store previous travel destinations of the navigation device from various locations and/or regions. Further, determination of the predicted travel destinations can be based at least in part on the previous travel destinations of the navigation device from the various locations and/or regions.

At 706, the method 700 can include determining, based at least in part on the current region and the predicted travel destinations, one or more additional regions associated with the current region. For example, a computing system (e.g., the computing system 130) and/or the navigation device (e.g., the computing device 102) can access data including information associated with one or more additional regions (e.g., one or more geographic regions) that include the predicted travel destinations. The one or more additional regions can be determined based at least in part on one or more spatial relationships of one or more locations within the current region with respect to one or more locations within the one or more additional regions. For example, the one or more additional regions can be determined based at least in part on being adjacent to the current region and/or within a threshold distance of the navigation device.

At 708, the method 700 can include determining connectivity information based at least in part on network data. The connectivity information can be associated with network connectivity available to the navigation device within each of the one or more additional regions. For example, a computing system (e.g., the computing system 130) and/or the navigation device (e.g., the computing device 102) can access network data including the amount of network throughput available within each of the one or more additional regions. Further, the network data can include information associated with the state of a communications network in each of the one or more additional regions at different times of day. For example, the available amount of network throughput at one o'clock in the afternoon (1:00 p.m.) may be greater than the available amount of network throughput at six o'clock in the evening (6:00 p.m.).

In some embodiments, any aspect of the connectivity information can be determined based at least in part on use of one or more machine-learned models (e.g., the one or more machine-learned models 120 and/or the one or more machine-learned models 140 that are depicted in FIG. 1) that have been configured and/or trained to determine the connectivity information based at least in part on input including any portion of the network data. For example, one or more machine-learned models can receive an input including portions of network data not including network throughput of an additional region (e.g., the locations of cellular transmission towers around an additional region) and can generate an output including connectivity information that includes the network throughput (e.g., estimated network throughput) in the additional region.

Further, the one or more machine-learned models (e.g., one or more machine-learned models implemented on the computing system 130) can be trained using training data including network data associated with one or more aspects of a communications network (e.g., signal to noise ratio) in a region (e.g., an additional region) at previous time intervals. Using the training data as input, the output of the one or more machine-learned models can be compared to ground-truth network connectivity information (e.g., network throughput) associated with the input and through evaluation and minimization of a loss associated with a loss function (e.g., a network throughput loss function) can be trained to more accurately generate an output including an estimated network throughput in an additional region based at least in part on input including other information associated with network data.

Furthermore, the connectivity information can include the state of the communications network at one or more locations within the current region and/or the one or more additional regions. For example, the current region can include four hundred sub-regions, and the connectivity information can include information associated with the state (e.g., amount of network throughput) in each of the four hundred sub-regions.

At 710, the method 700 can include prioritizing the one or more additional regions based at least in part on the connectivity information. Further, each of the one or more additional regions can be prioritized according to a set of criteria associated with the connectivity information. For example, a computing system (e.g., the computing system 130) and/or the navigation device (e.g., the computing device 102) can prioritize the regions based at least in part on an inverse correlation (negative correlation) between the amount of network throughput associated with an additional region, such that the one or more additional regions with the least network throughput are more highly prioritized than the one or more additional regions with a greater amount of network throughput.

In some embodiments, the set of criteria associated with the connectivity information can be weighted. For example, the criteria associated with the amount of network throughput below a threshold level in an additional region can be more highly weighted than the criteria associated with the size of the offline data associated with an additional region.

At 712, the method 700 can include sending one or more portions of offline map data to the navigation device. The one or more portions of offline map data can be associated with the respective one or more additional regions. Further, the one or more portions of offline map data can be sent to the navigation device in an order based at least in part on the priority of the one or more additional regions. For example, the computing system (e.g., the computing system 130) can send one or more wireless signals to the navigation device (e.g., the computing device 102) via a communications network (e.g., the network 180). The one or more portions of offline map data can be transmitted in an order based at least in part on the priority of the one or more additional regions (e.g., the portion of offline map data associated with the highest priority additional region is sent first). In some embodiments, the navigation device can send one or more signals requesting the one or more portions of offline map data from the computing system. Further, the one or more signals sent from the navigation device to the computing system can include an order in which the one or more portions of offline map data are to be sent to the navigation device.

Figure 8:
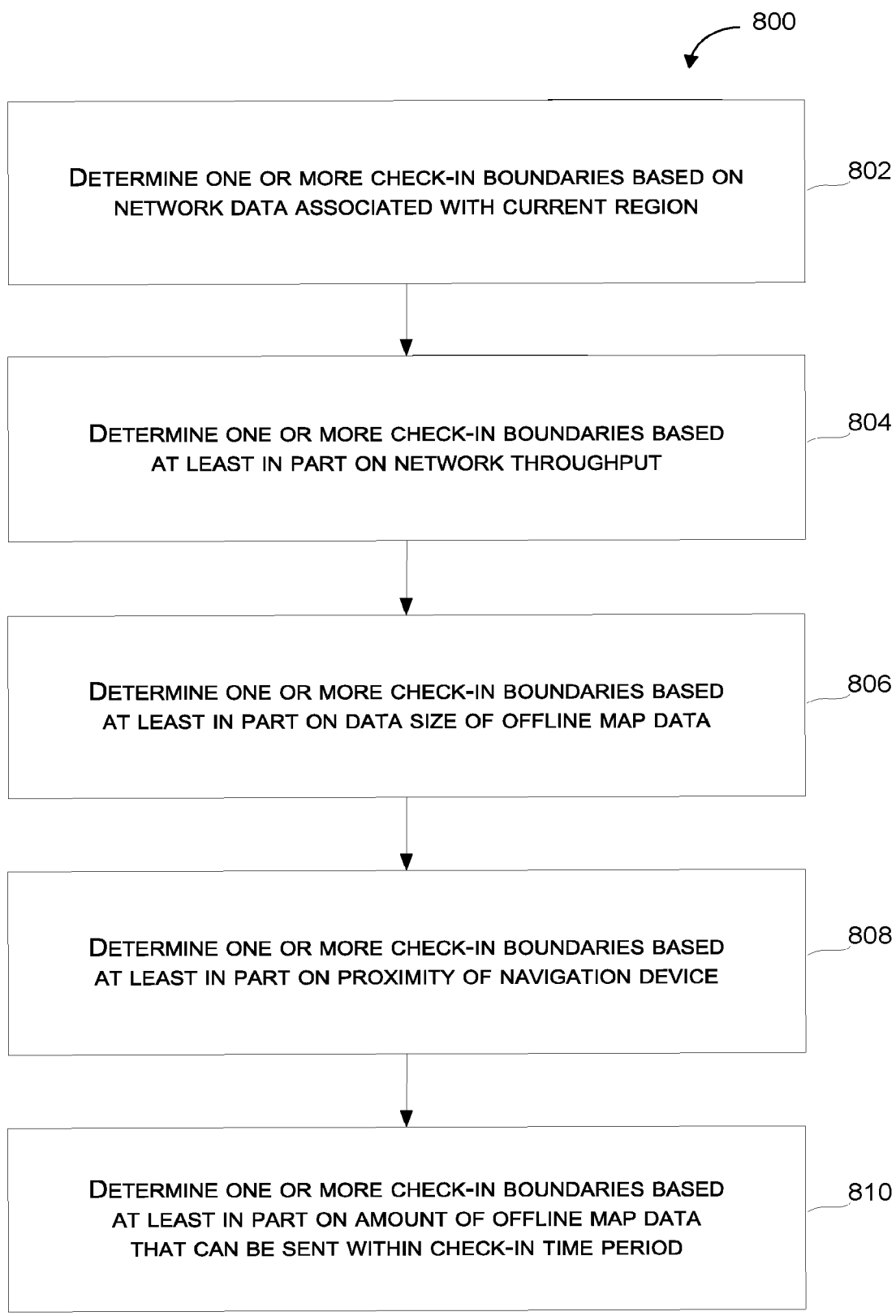
FIG. 8 depicts a flow diagram of dynamic offline map provision and retrieval according to example embodiments of the present disclosure

FIG. 8 depicts a flow diagram of dynamic offline map provision and retrieval according to example embodiments of the present disclosure. One or more portions of the method 800 can be executed and/or implemented on one or more computing devices or computing systems including, for example, the computing device 102, the computing system 130, the training computing system 150, and/or the remote computing system 170. Further, one or more portions of the method 800 can be executed or implemented as an algorithm on the hardware devices or systems disclosed herein. In some embodiments, one or more portions of the method 800 can be performed as part of the method 700 that is depicted in FIG. 7. FIG. 8 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 802, the method 800 can include determining one or more check-in boundaries associated with each of the one or more additional regions respectively. The one or more check-in boundaries can be based at least in part on the network data associated with the current region. By way of example, a computing system (e.g., the computing system 130) can receive one or more signals associated with the location of the navigation device (e.g., the computing device 102). Further, the computing system can access network data (e.g., locally stored network data and/or remotely stored network data) associated with the amount of network throughput available at the current location of the navigation device that is within the current region in which the navigation device is located. The computing system can also access the locally stored network data to determine a size of offline map data associated with the additional region to which the navigation device is travelling or predicted to travel. Based at least in part on the size of the offline map data and the amount of network throughput available in the current region, the computing system can determine the one or more check-in boundaries at which the offline map data can be downloaded to the navigation device and send the one or more portions of offline map data to the navigation device when the navigation device is located at a respective check-in boundary.

By way of further example, the navigation device can determine its location based at least in part on one or more signals from a positioning satellite. Further, the navigation device can access the computing system and request the computing system to send network data associated with the amount of network throughput available at the current location of the navigation device within the current region in which the navigation device is located. The navigation device can also access the computing system to determine a size of offline map data associated with the additional region to which the navigation device is travelling. Based at least in part on the size of the offline map data and the amount of network throughput available in the current region, the navigation device can determine the one or more check-in boundaries at which the offline map data can be sent to the navigation device before the navigation device is estimated to arrive at the additional region.

At 804, the method 800 can include determining the one or more check-in boundaries based at least in part on a network throughput associated with one or more locations (e.g., one or more geographic locations) in each of the one or more regions. For example, a computing system (e.g., the computing system 130) can receive one or more signals associated with the location of the navigation device (e.g., the computing device 102). Based on the location of the navigation device, the computing system can determine one or more additional regions associated with the current region in which the navigation device is located. Further, the computing system can access network data associated with the amount of network throughput available in each of the one or more additional regions. The computing system can also access network data to determine a size of a portion of offline map data associated with the additional region to which the navigation device is travelling. Based on the size of the portion of offline map data and the amount of network throughput available within the additional region, the computing system can determine the one or more check-in boundaries at which the offline map data can be downloaded to the navigation device and send the offline map data to the navigation device when the navigation device is located at a respective check-in boundary.

By way of further example, the navigation device can determine its location using one or more signals from a positioning satellite. Further, the navigation device can access the computing system and request network data associated with the amount of network throughput available at each of the one or more additional regions associated with the current region in which the navigation device is located. The navigation device can also access the computing system to determine a size of offline map data associated with the additional region to which the navigation device is travelling. Based on the size of the portion of offline map data and the amount of network throughput available in the additional region, the navigation device can determine the one or more check-in boundaries at which the offline map data can be downloaded to the navigation device before the navigation device is estimated to arrive at the additional region.

At 806, the method 800 can include determining the one or more check-in boundaries based at least in part on a data size of the one or more portions of offline map data associated with each of the one or more regions. For example, a computing system (e.g., the computing system 130) can receive one or more signals associated with the location of the navigation device (e.g., the computing device 102). Based at least in part on the location of the navigation device, the computing system can determine one or more additional regions associated with the current region in which the navigation device is located. Further, the computing system can access network data associated with the data size of offline map data associated with the additional region to which the navigation device is travelling. Based on the size of the offline map data and/or the amount of network throughput available within the current region and/or the additional region, the computing system can determine the one or more check-in boundaries at which the offline map data can be downloaded to the navigation device and send the offline map data to the navigation device when the navigation device is located at a respective check-in boundary.

In some embodiments, the navigation device can access the computing system to retrieve navigation data including the data size of the one or more portions of offline map data associated with each of the one or more regions. Further, the navigation device can determine its own location and perform one or more operations associated with determining the one or more check-in boundaries.

At 808, the method 800 can include prioritizing the one or more additional regions based at least in part on proximity of the navigation device to each of the one or more check-in boundaries. For example, a computing system (e.g., the computing system 130) can receive one or more signals associated with the location of the navigation device (e.g., the computing device 102). Based on the location of the navigation device, the computing system can determine the proximity of the navigation device to the one or more check-in boundaries (e.g., check-in boundaries that were previously determined). The computing system can then prioritize the one or more additional regions such that the one or more additional regions that are closer to the current location of the navigation device are prioritized more highly than the one or more regions that are further away from the navigation device. In some embodiments, the computing system can prioritize the one or more additional regions such that a portion of the one or more additional regions that are further away from the current location of the navigation device are prioritized more highly than the one or more regions that are closer to the navigation device.

In some embodiments, the navigation device can perform one or more portions of the operations associated with prioritizing the one or more additional regions including prioritizing the one or more additional regions that are closer more highly. For example, the navigation device can determine its own location and request data associated with the location (e.g., geographic location) of each of the one or more additional regions from the computing system. The navigation device can then prioritize the one or more check-in boundaries based at least in part on the proximity of the navigation device to the one or more check-in boundaries.

At 810, the method 800 can include determining, based at least in part on the current location of the navigation device, an amount of the offline map data that can be sent to the navigation device in a check-in time period. For example, a computing system (e.g., the computing system 130) can receive one or more signals associated with the location of the navigation device (e.g., the computing device 102). Based on the location of the navigation device, the computing system can determine one or more additional regions associated with the current region in which the navigation device is located. Further, the computing system can access network data associated with the amount of network throughput available in each of the one or more additional regions and/or a size of offline map data associated with the additional region to which the navigation device is travelling. Based on the size of the offline map data and/or the amount of network throughput available within the additional region, the computing system can determine a check-in time period associated with the amount of time required to send the one or more portions of offline map data to the navigation device.

In some embodiments, the navigation device can perform one or more portions of the operations associated with amount of the offline map data that can be sent to the navigation device in a check-in time period. For example, the navigation device can request data associated with the amount of offline map data in each of the one or more additional regions and the network throughput available within the additional region. The navigation device can then perform some portion of the one or more operations associated with determining the one or more check-in boundaries based at least in part on the amount of the offline map data that can be sent within the check-in time period.

Figure 9:
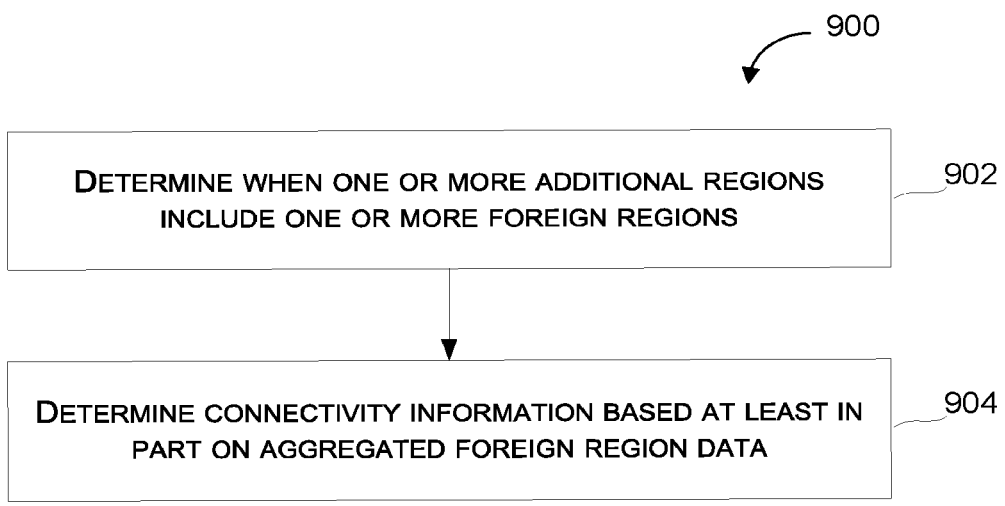
FIG. 9 depicts a flow diagram of dynamic offline map provision and retrieval according to example embodiments of the present disclosure.

FIG. 9 depicts a flow diagram of dynamic offline map provision and retrieval according to example embodiments of the present disclosure. One or more portions of the method 900 can be executed and/or implemented on one or more computing devices or computing systems including, for example, the computing device 102, the computing system 130, the training computing system 150, and/or the remote computing system 170. Further, one or more portions of the method 900 can be executed or implemented as an algorithm on the hardware devices or systems disclosed herein. In some embodiments, one or more portions of the method 900 can be performed as part of the method 700 that is depicted in FIG. 7. FIG. 9 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 902, the method 900 can include determining when the one or more additional regions include a foreign region associated with a nationality different from the current location. For example, a computing system (e.g., the computing system 130) can use network data (e.g., network data including a classification of one or more locations as foreign or non-foreign) to compare one or more locations in the one or more additional regions to foreign region data including the one or more locations associated with foreign regions and/or non-foreign regions. When the location of an additional region matches a foreign region, the computing system can determine that the additional region is a foreign region. An additional region can include a foreign region and a non-foreign region.

In some embodiments, when an additional region includes a foreign region and a non-foreign region, the portion of the additional region that is foreign can be determined to be a different and separate additional region from the portion of the additional region that is non-foreign. In some embodiments, when an additional region includes a foreign region and a non-foreign region, the entirety of the additional region can be determined to be either a foreign region or a non-foreign region. Further, whether the additional region is determined to be foreign or non-foreign can be based at least in part on the portion of the additional region that is determined to be a foreign region. For example, when the foreign portion of an additional region is greater than or equal to fifty percent (50%), the additional region be determined to be a foreign region.

In some embodiments, the navigation device (e.g., the computing device 102) can request data including network data from the computing system. Based at least in part on the network data, the navigation device can determine the one or more additional regions that are associated with a foreign region.

At 904, the method 900 can include determining the connectivity information based at least in part on aggregated foreign region data. The aggregated foreign region can include information associated with an aggregated level of connectivity available within the foreign region. For example, the computing system (e.g., the computing system 130) and/or the navigation device (e.g., the computing device 102) can determine the connectivity information for the foreign region based at least in part on accessing the aggregated foreign region data. In some embodiments, the aggregated foreign region data can, for example, include an indication of an average amount of network connectivity that is available throughout the foreign region.

Figure 10:
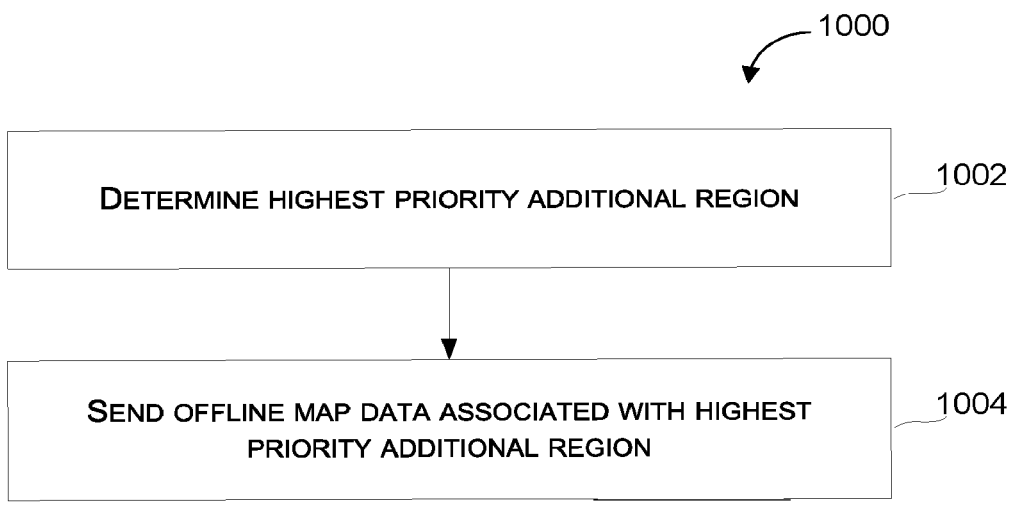
FIG. 10 depicts a flow diagram of dynamic offline map provision and retrieval according to example embodiments of the present disclosure.

FIG. 10 depicts a flow diagram of dynamic offline map provision and retrieval according to example embodiments of the present disclosure. One or more portions of the method 1000 can be executed and/or implemented on one or more computing devices or computing systems including, for example, the computing device 102, the computing system 130, the training computing system 150, and/or the remote computing system 170. Further, one or more portions of the method 1000 can be executed or implemented as an algorithm on the hardware devices or systems disclosed herein. In some embodiments, one or more portions of the method 1000 can be performed as part of the method 700 that is depicted in FIG. 7. FIG. 10 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1002, the method 1000 can include determining a highest priority region of the one or more additional regions. For example, the computing system (e.g., the computing system 130) can access data associated with the prioritization of the one or more additional regions and select the additional region with the highest priority. By way of further example, the navigation device (e.g., the computing device 102) can request the data associated with prioritization of the one or more additional regions from the computing system and select the additional region with the highest priority. In some embodiments, the navigation device can access locally stored data associated with the prioritization of the one or more additional regions and select the additional region with the highest priority.

At 1004, the method 1000 can include sending the one or more portions of offline map data associated with the highest priority region to the navigation device when the navigation device arrives at a check-in boundary associated with the highest priority region. For example, the navigation device (e.g., the computing device 102) can send one or more wireless signals to the computing system (e.g., the computing system 130) when the navigation device is within a predefined distance of the check-in boundary of the highest priority region. In response to receiving the one or more signals from the navigation device, the computing system can send one or more wireless signals including the one or more portions of offline map data associated with the highest priority region to the navigation device. In some embodiments, the computing system can send the one or more portions of offline map data to the navigation device at a predetermined time. For example, the computing system can determine an estimated time at which the navigation device will arrive at a check-in boundary associated with the highest priority and send the one or more portions of offline map data at the estimated time.

Figure 11:
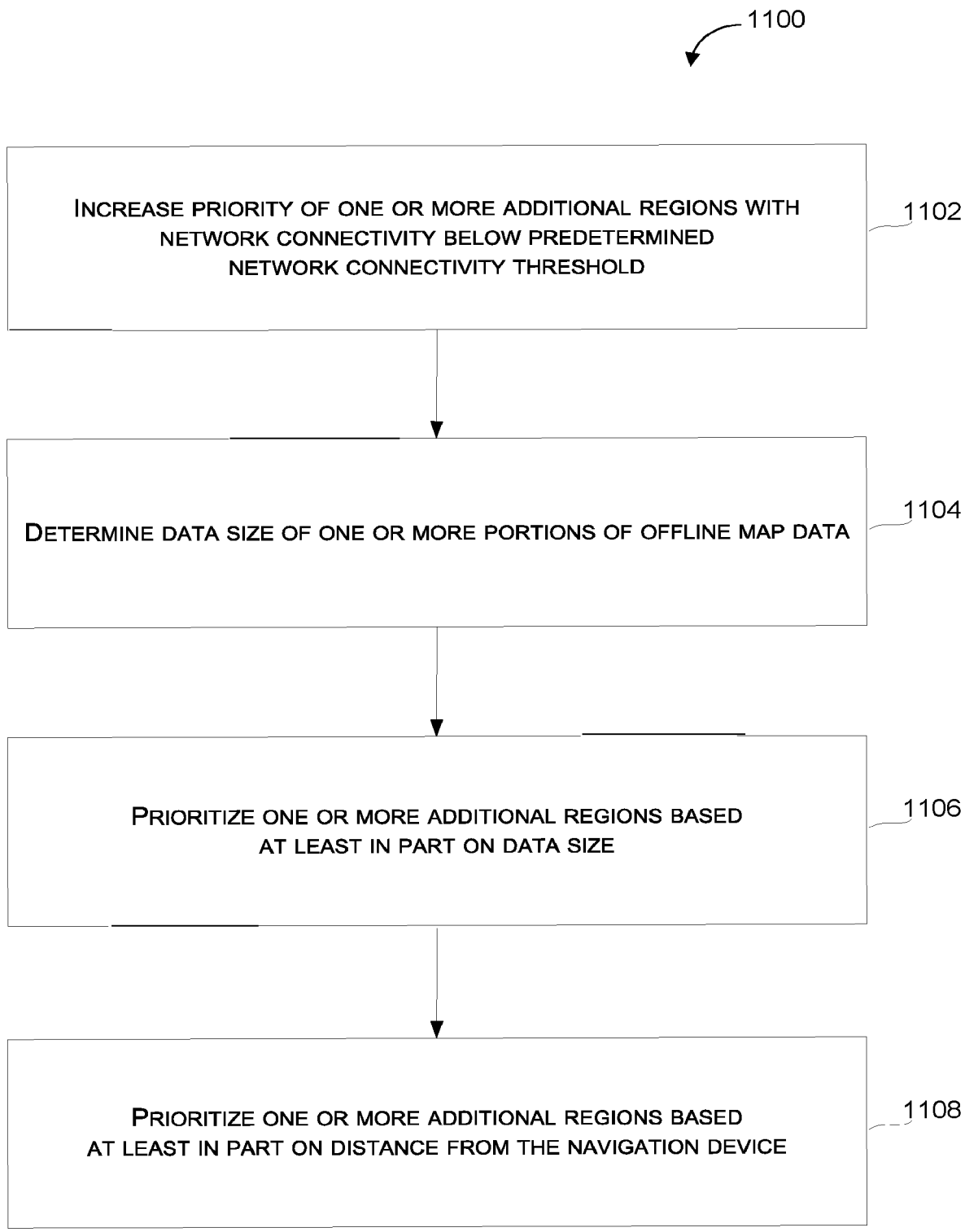
FIG. 11 depicts a flow diagram of dynamic offline map provision and retrieval according to example embodiments of the present disclosure.

FIG. 11 depicts a flow diagram of dynamic offline map provision and retrieval according to example embodiments of the present disclosure. One or more portions of the method 1100 can be executed and/or implemented on one or more computing devices or computing systems including, for example, the computing device 102, the computing system 130, the training computing system 150, and/or the remote computing system 170. Further, one or more portions of the method 1100 can be executed or implemented as an algorithm on the hardware devices or systems disclosed herein. In some embodiments, one or more portions of the method 1100 can be performed as part of the method 700 that is depicted in FIG. 7. FIG. 11 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1102, the method 1100 can include increasing the priority of the one or more additional regions in which the network connectivity is below a predetermined network connectivity threshold. For example, the predetermined network connectivity threshold can be a predetermined network throughput (e.g., 0.05 megabits per second). The computing system (e.g., the computing system 130) can increase the priority of any of the one or more additional regions with a throughput equal to, or below, the 0.05 megabits per second threshold. By way of further example, the predetermined network connectivity threshold can include a threshold portion of an additional region in which network connectivity is available. For example, with a ten percent network connection availability threshold the priority of an additional region in which network connectivity is available in less than ten percent of the additional region can be increased.

At 1104, the method 1100 can include determining a data size of each of the one or more portions of offline map data. For example, the network data can include information associated with the data size (e.g., a data size in megabytes) of the one or more portions of offline map data associated with each of the one or more additional regions respectively. A computing system (e.g., the computing system 130) and/or the navigation device (e.g., the computing device 102) can then access the network data to determine the data size of each of the one or more portions of offline map data.

At 1106, the method 1100 can include prioritizing the one or more additional regions based at least in part on the data size of each of the one or more portions of offline map data. A computing system (e.g., the computing system 130) and/or the navigation device (e.g., the computing device 102) can prioritize the one or more additional regions so that the one or more additional regions associated with the respective one or more portions of offline map data that have a greater data size have a higher priority and the one or more additional regions with portions of offline map data that have a smaller data size have lower priorities.

At 1108, the method 1100 can include prioritizing the one or more additional regions based at least in part on a distance from the navigation device to each of the one or more additional regions respectively. A computing system (e.g., the computing system 130) and/or the navigation device (e.g., the computing device 102) can prioritize the one or more portions of offline map data such that the one or more portions of offline map data that are closer to the navigation device have a higher priority and the one or more additional regions that are further away from the navigation device have a lower respective priority.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, comprising:
   determining, by a computing system comprising one or more processors, a current region associated with a current location of a navigation device;
   determining, by the computing system, predicted travel destinations from the current region;
   determining, by the computing system, based at least in part on the current region and the predicted travel destinations, one or more additional regions associated with the current region;
   determining, by the computing system, connectivity information based at least in part on network data, wherein the connectivity information is associated with network connectivity available to the navigation device within each of the one or more additional regions;
   prioritizing, by the computing system, the one or more additional regions with respect to each other based at least in part on the connectivity information for each of the one or more regions;
   determining, by the computing system, a highest priority additional region among the one or more additional regions; and
   sending, by the computing system, one or more portions of map data associated with the highest priority additional region to the navigation device when the navigation device arrives at a check-in boundary associated with the highest priority additional region, wherein the check-in boundary associated with the highest priority additional region is located at a predetermined distance from a particular portion of the highest priority additional region.

2. The computer-implemented method of claim 1, wherein
   the connectivity information is associated with network connectivity available to the navigation device within each of the one or more additional regions, and
   determining, by the computing system, the connectivity information based at least in part on network data, comprises:
   determining, by the computing system, based at least in part on the network data associated with the current region, the check-in boundary associated with the highest priority additional region.

3. The computer-implemented method of claim 2, further comprising:
   determining, by the computing system, the check-in boundary associated with the highest priority additional region based at least in part on a network throughput associated with one or more locations in the highest priority additional region.

4. The computer-implemented method of claim 2, further comprising:

determining, by the computing system, the check-in boundary associated with the highest priority additional region based at least in part on a data size of the one or more portions of map data associated with the highest priority additional region.

5. The computer-implemented method of claim 2, wherein prioritizing, by the computing system, the one or more additional regions with respect to each other is further based at least in part on proximity of the navigation device to each of one or more check-in boundaries.

6. The computer-implemented method of claim 2, further comprising:
determining, by the computing system, based at least in part on the current location of the navigation device, an amount of the map data that can be sent to the navigation device in a check-in time period comprising an amount of time between when the navigation device is located at a nearest check-in boundary of one or more check-in boundaries and when the navigation device arrives at the region associated with the nearest check-in boundary, wherein the check-in time period is based at least in part on a velocity of the navigation device.

7. The computer-implemented method of claim 1, wherein
the connectivity information is associated with network connectivity available to the navigation device within each of the one or more additional regions, and
determining, by the computing system, the connectivity information based at least in part on the network data, comprises:
determining, by the computing system, when the one or more additional regions comprise a foreign region associated with a nationality different from the current location; and
determining, by the computing system, the connectivity information based at least in part on aggregated foreign region data comprising information associated with an aggregated level of connectivity available within the foreign region.

8. The computer-implemented method of claim 7, wherein the aggregated foreign region data is based at least in part on an average amount of the network connectivity provided by carrier networks within the foreign region.

9. The computer-implemented method of claim 8, wherein the average amount of the network connectivity is based at least in part on a sample weighted mean of network connectivity within the foreign region.

10. The computer-implemented method of claim 1, wherein the one or more additional regions associated with the current region comprise one or more additional regions adjacent to the current region, one or more additional regions within a predetermined distance from the current region, one or more additional regions outside of a predetermined distance from the current region, or one or more additional regions that overlap the current region.

11. The computer-implemented method of claim 1, wherein prioritizing, by the computing system, the one or more additional regions, comprises:
increasing, by the computing system, the priority of regions among the one or more additional regions in which the network connectivity is below a predetermined network connectivity threshold.

12. The computer-implemented method of claim 1, wherein prioritizing, by the computing system, the one or more additional regions, further comprises:
determining, by the computing system, a data size of each of the one or more portions of map data; and
prioritizing, by the computing system, the one or more additional regions based at least in part on the data size of each of the one or more portions of map data and on the connectivity information for each of the one or more regions.

13. The computer-implemented method of claim 1, wherein the connectivity information for each of the one or more regions indicates at least one of a signal strength in one or more locations in each of the one or more additional regions, a signal to noise ratio in one or more locations in each of the one or more additional regions, or a network throughput in one or more locations in each of the one or more additional region.

14. The computer-implemented method of claim 1, wherein
the particular portion of the highest priority additional region includes a nearest edge of the highest priority additional region or a center of the highest priority additional region.

15. One or more tangible non-transitory computer-readable media storing computer-readable instructions that when executed by one or more processors cause the one or more processors to perform operations, the operations comprising:
determining a current region associated with a current location of a navigation device;
determining predicted travel destinations from the current region;
determining, based at least in part on the current region and the predicted travel destinations, one or more additional regions associated with the current region;
determining connectivity information based at least in part on network data, wherein the connectivity information is associated with network connectivity available to the navigation device within each of the one or more additional regions;
prioritizing the one or more additional regions with respect to each other based at least in part on the connectivity information for each of the one or more regions;
determining a highest priority additional region among the one or more additional regions; and
sending one or more portions of map data associated with the highest priority additional region to the navigation device when the navigation device arrives at a check-in boundary associated with the highest priority additional region, wherein the check-in boundary associated with the highest priority additional region is located at a predetermined distance from a particular portion of the highest priority additional region.

16. The one or more tangible non-transitory computer-readable media of claim 15, wherein determining the predicted travel destinations from the current region comprises determining, based at least in part on aggregated travel data, the predicted travel destinations from the current region, wherein the aggregated travel data comprises previous travel destinations from within the current region which are associated with a plurality of navigation devices.

17. The one or more tangible non-transitory computer-readable media of claim 15, wherein a size of each of the one or more additional regions is directly correlated with a distance from the current location of the navigation device to each of the one or more additional regions respectively.

18. A computing system, comprising:
one or more processors;

one or more non-transitory computer-readable media storing instructions that when executed by the one or more processors cause the one or more processors to perform operations comprising:
  determining a current region associated with a current location of a navigation device;
  determining predicted travel destinations from the current region;
  determining, based at least in part on the current region and the predicted travel destinations, one or more additional regions associated with the current region;
  determining connectivity information based at least in part on network data, wherein the connectivity information is associated with network connectivity available to the navigation device within each of the one or more additional regions;
  prioritizing the one or more additional regions with respect to each other based at least in part on the connectivity information for each of the one or more regions;
  determining a highest priority additional region among the one or more additional regions; and
  sending one or more portions of map data associated with the highest priority additional region to the navigation device when the navigation device arrives at a check-in boundary associated with the highest priority additional region, wherein the check-in boundary associated with the highest priority additional region is located at a predetermined distance from a particular portion of the highest priority additional region.

19. The computing system of claim 18, wherein determining the predicted travel destinations from the current region comprises determining, based at least in part on aggregated travel data, the predicted travel destinations from the current region, wherein the aggregated travel data comprises previous travel destinations from within the current region which are associated with a plurality of navigation devices.

20. The computing system of claim 18, wherein the network data comprises at least one of a size of each of the one or more portions of map data associated with each of the one or more additional regions, one or more low connectivity zones in which network throughput is below a network throughput threshold, a signal strength in one or more locations in each of the one or more additional regions, a signal to noise ratio in one or more locations in each of the one or more additional regions, or a network throughput in one or more locations in each of the one or more additional regions.

* * * * *